(12) United States Patent
Kim et al.

(10) Patent No.: US 11,681,638 B2
(45) Date of Patent: Jun. 20, 2023

(54) METHOD OF SYNCHRONIZING TIME BETWEEN HOST DEVICE AND STORAGE DEVICE AND SYSTEM PERFORMING THE SAME

(71) Applicant: SAMSUNG ELECTRONICS CO., LTD., Suwon-si (KR)

(72) Inventors: Semi Kim, Suwon-si (KR); Wookhan Jeong, Pocheon-si (KR); Dongmin Kim, Hwaseong-si (KR); Jeongwoo Park, Hwaseong-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 88 days.

(21) Appl. No.: 17/477,784

(22) Filed: Sep. 17, 2021

(65) Prior Publication Data

US 2022/0283968 A1    Sep. 8, 2022

(30) Foreign Application Priority Data

Mar. 8, 2021    (KR) .......................... 10-2021-0030078

(51) Int. Cl.
*G06F 13/16* (2006.01)
*G11C 8/08* (2006.01)
*G11C 7/12* (2006.01)
*G06F 1/12* (2006.01)
*G06F 3/06* (2006.01)

(52) U.S. Cl.
CPC ................ *G06F 13/1689* (2013.01)

(58) Field of Classification Search
CPC .................................................. G06F 13/1689

USPC ........................................................ 710/104
See application file for complete search history.

(56) References Cited

U.S. PATENT DOCUMENTS

| | | | |
|---|---|---|---|
| 6,950,835 | B1 | 9/2005 | Starbuck |
| 7,007,045 | B2 | 2/2006 | Starbuck |
| 7,216,134 | B2 | 5/2007 | Starbuck |
| 7,269,609 | B2 | 9/2007 | Starbuck |
| 7,284,021 | B2 | 10/2007 | Starbuck |
| 7,305,423 | B2 | 12/2007 | Starbuck |
| 7,370,067 | B2 | 5/2008 | Starbuck |
| 7,620,663 | B2 | 11/2009 | Starbuck |
| 7,796,548 | B2 | 9/2010 | Lee |
| 8,274,374 | B2 | 9/2012 | Kim et al. |
| 9,602,867 | B2 | 3/2017 | Sung et al. |
| 10,016,654 | B2 | 7/2018 | Park |
| 10,169,171 | B2 | 1/2019 | Rebello et al. |
| 10,536,357 | B2 * | 1/2020 | Deen .................... H04L 43/026 |

(Continued)

FOREIGN PATENT DOCUMENTS

| | | | |
|---|---|---|---|
| JP | 6612526 | B2 | 11/2019 |
| KR | 10-0325089 | B1 | 4/2002 |

(Continued)

*Primary Examiner* — Chun Kuan Lee
(74) *Attorney, Agent, or Firm* — Sughrue Mion, PLLC

(57) ABSTRACT

A method of synchronizing time between a host device and a storage device is provided. The method includes: identifying, by the storage device, a time synchronization interval; notifying the time synchronization interval from the storage device to the host device; providing host time information from the host device to the storage device during the time synchronization interval; and synchronizing, by the storage device, time information of the storage device with the host time information.

20 Claims, 27 Drawing Sheets

(56) References Cited

U.S. PATENT DOCUMENTS

| | | | |
|---|---|---|---|
| 10,936,010 B2 * | 3/2021 | Meiri | G06F 1/12 |
| 2012/0084471 A1 * | 4/2012 | Tang | G06F 13/385 |
| | | | 710/104 |
| 2012/0209939 A1 | 8/2012 | Ito et al. | |
| 2016/0262120 A1 * | 9/2016 | Shani | H04W 56/001 |
| 2017/0123659 A1 | 5/2017 | Nam et al. | |
| 2019/0332323 A1 | 10/2019 | Choi | |
| 2021/0181978 A1 * | 6/2021 | Van Sickle | G11C 14/0018 |

FOREIGN PATENT DOCUMENTS

| | | |
|---|---|---|
| KR | 10-0676776 B1 | 2/2007 |
| KR | 10-0703490 B1 | 4/2007 |
| KR | 10-0916222 B1 | 9/2009 |
| KR | 10-0935084 B1 | 12/2009 |
| KR | 10-1224821 B1 | 1/2013 |
| KR | 10-1434514 B1 | 8/2014 |

* cited by examiner

FIG. 9

| General UPIU Format | | | |
|---|---|---|---|
| 0 Transaction Type | 1 Flags | 2 LUN | 3 Task Tag |
| 4 Command Set Type / IID | 5 Query Function/ Task Manag Function | 6 Response | 7 Status |
| 8 Total EHS Length | 9 Reserved | 10 (MSB) Data Segment Length | 11 (LSB) |
| 12 | 13 | 14 | 15 |
| 16 | | | 19 |
| 20 | Transaction Specific Fields | | 23 |
| 24 | | | 27 |
| 28 | | | 31 |
| k | k+1 Extra Header Segment(EHS)1 | k+2 | k+3 |
| ... | | | |
| j | j+1 Extra Header Segment(EHS)N | j+2 | j+3 |
| Header E2ECRC(omit if HD=0) | | | |
| Data Segment | | | |
| Data E2ECRC(omit if HD=0) | | | |

FIG. 10

| | 0 | 1 | 2 | 3 |
|---|---|---|---|---|
| | xx10 0001b | Flags | LUN | Task Tag |
| 4 | IID | Command Set Type | 5 Reserved | 6 Response | 7 Status |
| 8 | Total EHS Length(00h) | 9 Device Information | 10 (MSB) Data Segment Length | 11 (LSB) |

RESPONSE UPIU

FLD1 points to Device Information field

FIG. 11

| | | Device Information | |
|---|---|---|---|
| Bit | Name | Description | |
| B[0] | EVENT_ALERT | Exception Event Alert<br>0b.All exception sources not active<br>1b.At least one exception source is active | |
| B[1] | TIME_REQUEST | Time Information Request<br>0b no need time information<br>1b need time information | |
| B[2:7] | Reserved | | |

FIG. 12

| | | | | |
|---|---|---|---|---|
| | 0 xx00 0001b | 1 Flags | 2 LUN | 3 Task Tag |
| | 4 IID \| Command Set_Type | 5 Reserved | 6 Reserved | 7 Reserved |
| FLD2 | 8 Total EHS Length(00h) | 9 Reserved | 10 (MSB) Data Segment Length(0000h) | 11 (LSB) |
| | 12 (MSB) Expected Data Transfer Length | 13 | 14 | 15 (LSB) |
| | 16 CDB[0] | 17 CDB[1] | 18 CDB[2] | 19 CDB[3] |
| | 20 CDB[4] | 21 CDB[5] | 22 CDB[6] | 23 CDB[7] |
| | 24 CDB[8] | 25 CDB[9] | 26 CDB[10] | 27 CDB[11] |
| | 28 CDB[12] | 29 CDB[13] | 30 CDB[14] | 31 CDB[15] |

COMMAND UPIU

FIG. 13A

| | 0 | 1 | 2 | 3 |
|---|---|---|---|---|
| | \multicolumn{4}{c}{COMMAND UPIU} |
| 0 | xx00 0001b | Flags | LUN | Task Tag |
| 4 | IID \| Command Set Type | Reserved | Reserved | Reserved |
| 8 | Total EHS Length(02h) | Reserved | (MSB) Data Segment Length(0000h) | (LSB) |
| 12 | (MSB) Expected Data Transfer Length | | | (LSB) |
| 16 | CDB[0] | CDB[1] | CDB[2] | CDB[3] |
| 20 | CDB[4] | CDB[5] | CDB[6] | CDB[7] |
| 24 | CDB[8] | CDB[9] | CDB[10] | CDB[11] |
| 28 | CDB[12] | CDB[13] | CDB[14] | CDB[15] |
| 32 | | | | |
| | \multicolumn{4}{c}{EHS1} |
| 36 | | | | |
| | \multicolumn{4}{c}{EHS2} |

FLD2 brackets bytes 8 (Total EHS Length)
FLD3 brackets bytes 32–39 (EHS1, EHS2)

FIG. 13B

| Byte | Name | Description | Value |
|---|---|---|---|
| Byte 32:39 | Time Information | Host Time Information Corresponding to Time Resolution | 456512358 |

FIG. 16A

| | 0 | 1 | 2 | 3 |
|---|---|---|---|---|
| | \multicolumn{4}{c}{QUERY REQUEST UPIU} | | | |
| 0 | xx01 0110b | Flags | Reserved | Task Tag |
| 4 | Reserved | Query Function | Reserved | Reserved |
| 8 | Total EHS Length(00h) | Reserved | (MSB) | (LSB) |
| | | | \multicolumn{2}{c}{Data Segment Length} | |
| 12 | 13 | 14 | Transaction Specific Fields | 15 |
| 16 | 17 | 18 | Transaction Specific Fields | 19 |
| 20 | 21 | 22 | Transaction Specific Fields | 23 |
| 24 | 25 | 26 | Transaction Specific Fields | 27 |
| 28 | 29 | 30 | Reserved | 31 |
| | \multicolumn{4}{c}{Header E2ECRC(omit if HD=0)} | | | |
| k | Data[0] | Data[1] | Data[2] | Data[3] |
| k+ Length-4 Data[Length-4] | ... | k+ Length-3 Data[Length-3] | k+ Length-2 Data[Length-2] | k+ Length-1 Data[Length-1] |
| | \multicolumn{4}{c}{Data E2ECRC(omit if DD=0)} | | | |

FIG. 16B

QUERY RESPONSE UPIU

| | 0 | 1 | 2 | 3 |
|---|---|---|---|---|
| 0 | xx11 0110b | Flags | Reserved | Task Tag |
| 4 | Reserved | Query Function | Query Response | Reserved |
| 8 | Total EHS Length(00h) | Device Information | (MSB) Data Segment Length | (LSB) |
| 12 | 13 | 14 Transaction Specific Fields | | 15 |
| 16 | 17 | 18 Transaction Specific Fields | | 19 |
| 20 | 21 | 22 Transaction Specific Fields | | 23 |
| 24 | 25 | 26 Transaction Specific Fields | | 27 |
| 28 | 29 | 30 Reserved | | 31 |
| | Header E2ECRC(omit if HD=0) | | | |
| k | Data[0] | k+1 Data[1] | k+2 Data[2] | k+3 Data[3] |
| ... | ... | ... | ... | ... |
| k+ Length-4 Data[Length-4] | | k+ Length-3 Data[Length-3] | k+ Length-2 Data[Length-2] | k+ Length-1 Data[Length-1] |
| | Data E2ECRC(omit if DD=0) | | | |

FIG. 17

| | UFS ATTRIBUTES | | |
|---|---|---|---|
| IDN | Name | Property | Size | Description |
| 20h | bDeviceTimeResolution | Read Only | 1 byte | Device Supported Time Resolution<br>bit[0]:nanosecond(ns)<br>bit[1]:microsecond(us)<br>bit[2]:millisecond(ms)<br>bit[3] second(s) |
| 21h | bHostTimeResolution | Read/Write | 1 byte | Host Configured Time Resolution<br>value:same with above |

FIG. 19

| Bit | Name | Device Information | |
|---|---|---|---|
| | | Description | |
| B[0] | EVENT_ALERT | Exception Event Alert<br>0b:All exception sources not active<br>1b:At least one exception source is active | |
| B[1] | TIME_REQUEST | Time Information Request<br>0b.no need time information<br>1b.need time information | |
| B[2:5] | TIME_RESOLUTION | Device Supported Time Resolution<br>B[2]:nanosecond(ns)<br>B[3] microsecond(us)<br>B[4] millisecond(ms)<br>B[5] second(s) | |
| B[6:7] | Reserved | | |

FIG. 22

| SYNCHRONIZATION CONDITION | UPIU | UPIU | UPIU |
|---|---|---|---|
| T1 TRANSFER | UPIU | UniPro Attributes | UniPro Attributes |
| | | | UniPro Attributes |

METHOD OF SYNCHRONIZING TIME BETWEEN HOST DEVICE AND STORAGE DEVICE AND SYSTEM PERFORMING THE SAME

CROSS-REFERENCE TO RELATED APPLICATION

This application claims priority to Korean Patent Application No. 10-2021-0030078, filed on Mar. 8, 2021 in the Korean Intellectual Property Office, the disclosure of which is incorporated by reference herein in its entirety.

BACKGROUND

1. Technical Field

Example embodiments relate generally to semiconductor integrated circuits, and more particularly to a method of synchronizing time between a host device and a storage device, and a system performing the method.

2. Discussion of Related Art

One or more semiconductor memory devices may be used in data storage devices. Examples of such data storage devices include solid state drives (SSDs). These types of data storage devices may have various design and/or performance advantages over hard disk drives (HDDs). For example, such data storage devices may have no moving mechanical parts, higher data access speeds, improved stability, improved durability, and/or reduced power consumption. Various systems, e.g., a laptop computer, a car, an airplane, a drone, etc., have adopted the storage devices. Recently, to improve or increase the performance and/or lifetime of the storage device, various schemes of managing time information of the storage device have been researched.

SUMMARY

Some example embodiments provide a method of synchronizing time between a host device and a storage device, and a system performing the method.

According to example embodiments, a method of synchronizing time between a host device and a storage device includes: identifying, by the storage device, a time synchronization interval; notifying the time synchronization interval from the storage device to the host device; providing host time information from the host device to the storage device during the time synchronization interval; and synchronizing, by the storage device, time information of the storage device with the host time information.

According to example embodiments, a system includes a storage device and a host device. The storage device includes: a storage controller; and a plurality of nonvolatile memory devices; and the host device includes a host processor. The storage controller is configured to identify a time synchronization interval, and control the storage device to notify the time synchronization interval to the host device, and the host processor is configured to control the host device to provide host time information to the storage device during the time synchronization interval.

According to example embodiments, a method of synchronizing time between a host device and a storage device that communicate with each other according to universal flash storage (UFS) standards is provided. The method includes: identifying, by the storage device, a time synchronization interval; notifying a start of the time synchronization interval from the storage device to the host device; providing host time information from the host device to the storage device based on the time synchronization interval; notifying an end of the time synchronization interval from the storage device to the host device; and stopping, by the host device, provision of the host time information based on the end of the time synchronization interval. The start of the time synchronization interval and the end of the time synchronization interval are notified from the storage device to the host device and the host time information is provided from the host device to the storage device, using UFS protocol information units (UPIUs) or UniPro attributes of the host device or the storage device according to the UFS standards.

One or more example embodiments reduce overhead due to transfer of the time information and enhance performance of the storage device and the system, by providing the time information from the host device to the storage device only during the time synchronization interval that is identified by the storage device.

In addition, one or more example embodiments further reduce the overhead of transferring the time information, by transferring the time information using the established signals without additional signals for the time information transfer.

BRIEF DESCRIPTION OF THE DRAWINGS

The above, and other aspects, features and advantages will be more clearly understood from the following detailed description of example embodiments, taken in conjunction with the accompanying drawings in which:

FIG. 9 is a diagram illustrating a UFS protocol information unit (UPIU) used in a time synchronization method according to example embodiments.

FIGS. 10 and 11 are diagrams illustrating an example notification of a time synchronization interval by a time synchronization method according to example embodiments.

FIGS. 12, 13A and 13B are diagrams illustrating an example of providing time information by a time synchronization method according to example embodiments.

FIGS. 16A, 16B and 17 are diagrams illustrating an example of setting a time resolution by a time synchronization method according to example embodiments.

FIG. 19 is a diagram illustrating an example of setting a time resolution by a time synchronization method according to example embodiments.

FIG. 22 is a diagram illustrating a time synchronization method according to example embodiments.

DETAILED DESCRIPTION

Figure 1:
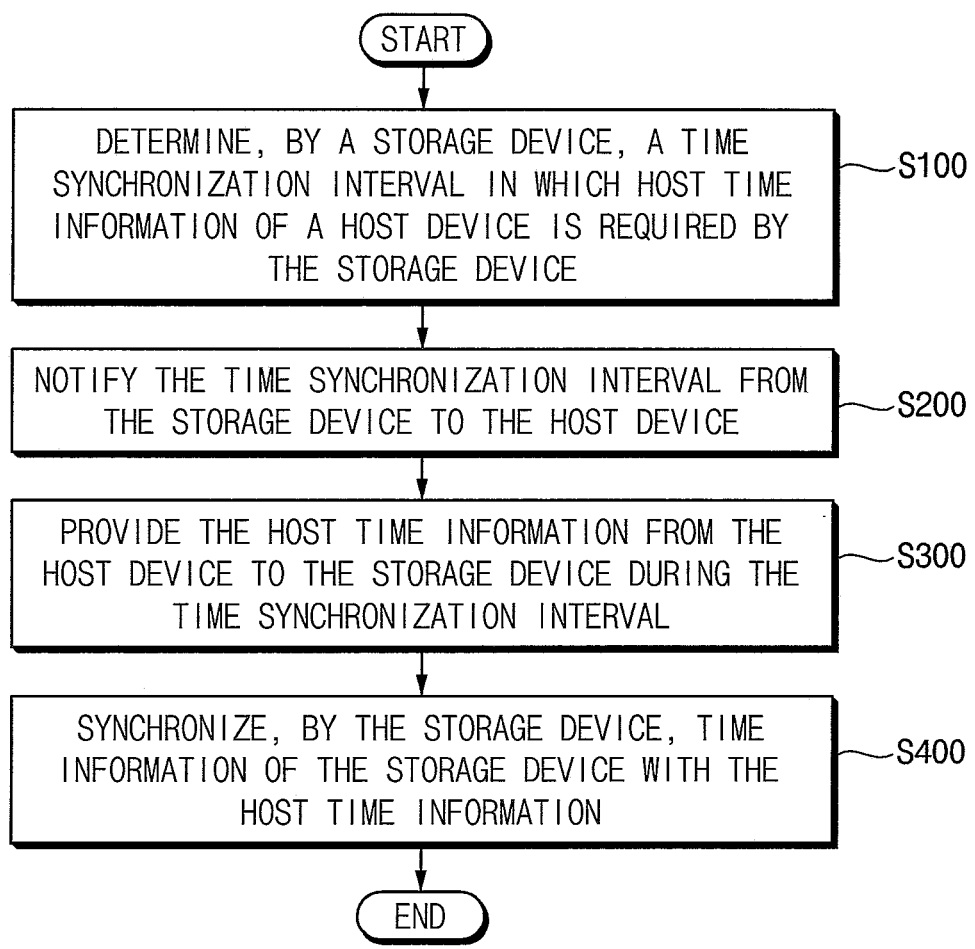
FIG. 1 is a flowchart illustrating a time synchronization method according to example embodiments.

Various example embodiments will be described more fully hereinafter with reference to the accompanying drawings, in which some example embodiments are shown. In the drawings, like numerals refer to like elements throughout. The repeated descriptions may be omitted. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a flowchart illustrating a time synchronization method according to example embodiments.

Referring to FIG. 1, a method of synchronizing time according to example embodiments is performed by a system including a host device and a storage device. The storage device operates based on a command received from a host device that is located outside the storage device. Detailed configurations of the system, including the host device and the storage device, will be described below.

In the method of synchronizing time between the host device and the storage device, a time synchronization interval, in which host time information of the host device is required by the storage device, is identified by a storage device (S100). The storage device may include a timer and manage the time information of the storage device based on a local time provided from the timer. However, the operation of the timer may be limited, for example, during a power cycle or a hibernation interval, and the storage device may require the host time information for the time synchronization between the host device and the storage device. The storage device may determine the time synchronization interval periodically or aperiodically.

The time synchronization interval is notified from the storage device to the host device (S200). The host time information is provided from the host device to the storage device during the time synchronization interval (S300). The storage device may notify a start of the time synchronization interval and an end of the time synchronization interval to the host device. The host device may provide the host time information to the storage device based on the notification of the star of the time synchronization interval, and stop provision of the host time information based on the notification of the end of the time synchronization interval.

In some example embodiments, as will be described below with reference to FIGS. 8 through 19, the time synchronization interval may be notified from the storage device to the host device and the host time information may be provided from the host device to the storage device, using universal flash storage (UFS) protocol information units (UPIUs) according to UFS standards.

In some example embodiments, as will be described below with reference to FIGS. 20 and 21, the time synchronization interval may be notified from the storage device to the host device and the host time information may be provided from the host device to the storage device, using UniPro attributes of the host device or the storage device according to the UFS standards.

Time information of the storage device is synchronized with the host time information by the storage device (S400). In some example embodiments, the storage device may compensate for the host time information based on the local time provided from the timer embedded in the storage device and manage the storage time information based on the compensated host time information.

As will be described below with reference to FIG. 23, various tasks may be performed to enhance performance of the system using the storage time information synchronized with the host time information.

In related schemes, the host device sets the period for providing the host time information to the storage device, and the host device provides the host time information periodically to the storage device using an additional command. In this case, overhead may be caused in an interface between the host device and the storage device due to the transfer of the additional command for the provision of the time information.

Example embodiments may reduce overhead due to transfer of the time information and enhance performance of the storage device and the system, by providing the time information from the host device to the storage device only during the time synchronization interval that is identified by the storage device.

In addition, example embodiments may further reduce the overhead of transferring the time information, by transferring the time information using established signals, without additional signals or commands, for the time information transfer.

Figure 2:
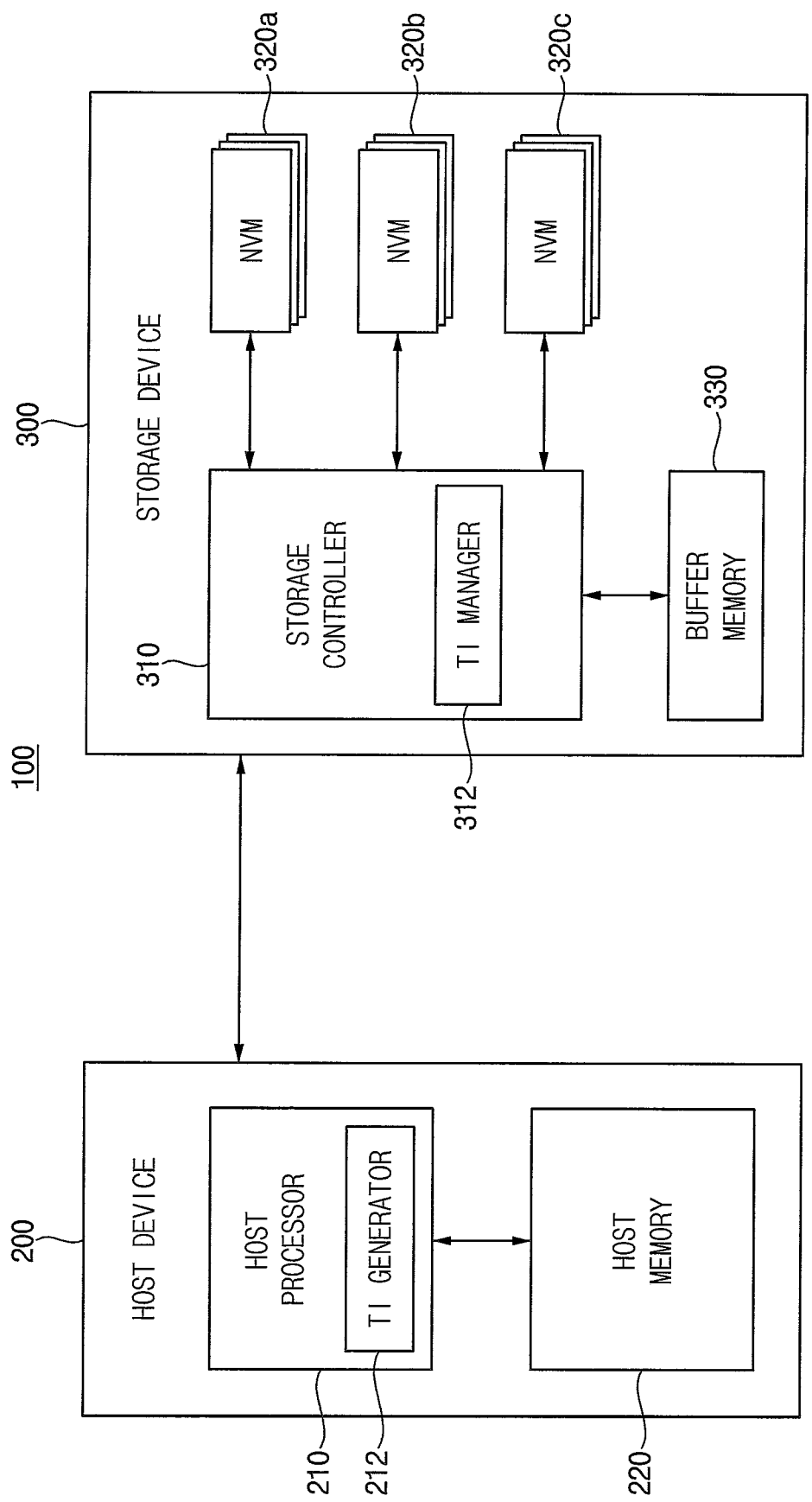
FIG. 2 is a block diagram illustrating a storage system including a storage device according to example embodiments.

FIG. 2 is a block diagram illustrating a storage system including a storage device according to example embodiments.

Referring to FIG. 2, a storage system 100 includes a host device 200 and a storage device 300.

The host device 200 controls overall operations of the storage system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the storage device 300 at the operating system level. For example, the host processor 210 may include at least one of various processing units, e.g., a central processing unit (CPU), or the like.

The host memory 220 may store instructions and/or data that are executed and/or processed by the host processor 210. For example, the host memory 220 may include at least one of various volatile memories, e.g., a dynamic random access memory (DRAM), or the like.

The storage device 300 is accessed by, that is, communicably coupled to the host device 200. The storage device 300 may include a storage controller 310, a plurality of nonvolatile memories 320a, 320b and 320c, and a buffer memory 330.

The storage controller 310 may control an operation of the storage device 300, e.g., a data write operation and/or a data read operation, based on a command and data that are received from the host device 200.

The host processor 210 and the storage controller 310 may be configured to perform the time synchronization method as described with reference to FIG. 1. For example, the host processor 210 may include a time information (TI) generator 212 that generates host time information of the host device 200, and the storage controller 310 may include a time TI manager 312 that receives the host time information and manages storage time information of the storage device 300 based on the received host time information. The TI manager 312 may determine or identify the time synchronization interval in which the host time information of the host device 200 is required by the storage device 300 and notify the time synchronization interval to the host device 200. The host device 200 may provide the host time information to the storage device 300 during the time synchronization interval, and the TI manager 312 may synchronize the storage time information of the storage device with the host time information.

The plurality of nonvolatile memories 320a, 320b and 320c may store a plurality of data. For example, the plurality of nonvolatile memories 320a, 320b and 320c may store the meta data, various user data, or the like.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a static random access memory (SRAM), a DRAM, or the like.

In some example embodiments, the storage device 300 may be a universal flash storage (UFS). In other example embodiments, the storage device 300 may be a solid state drive (SSD), a multi-media card (MMC) or an embedded multi-media card (eMMC). In still other example embodiments, the storage device 300 may be one of a secure digital (SD) card, a micro SD card, a memory stick, a chip card, a universal serial bus (USB) card, a smart card, a compact flash (CF) card, or the like.

In some example embodiments, the storage device 300 may be connected to the host device 200 via a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b and 320c to provide the block accessible interface to the host device 200, for allowing the access by units of a memory block with respect to data stored in the plurality of nonvolatile memories 320a, 320b and 320c.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 3:
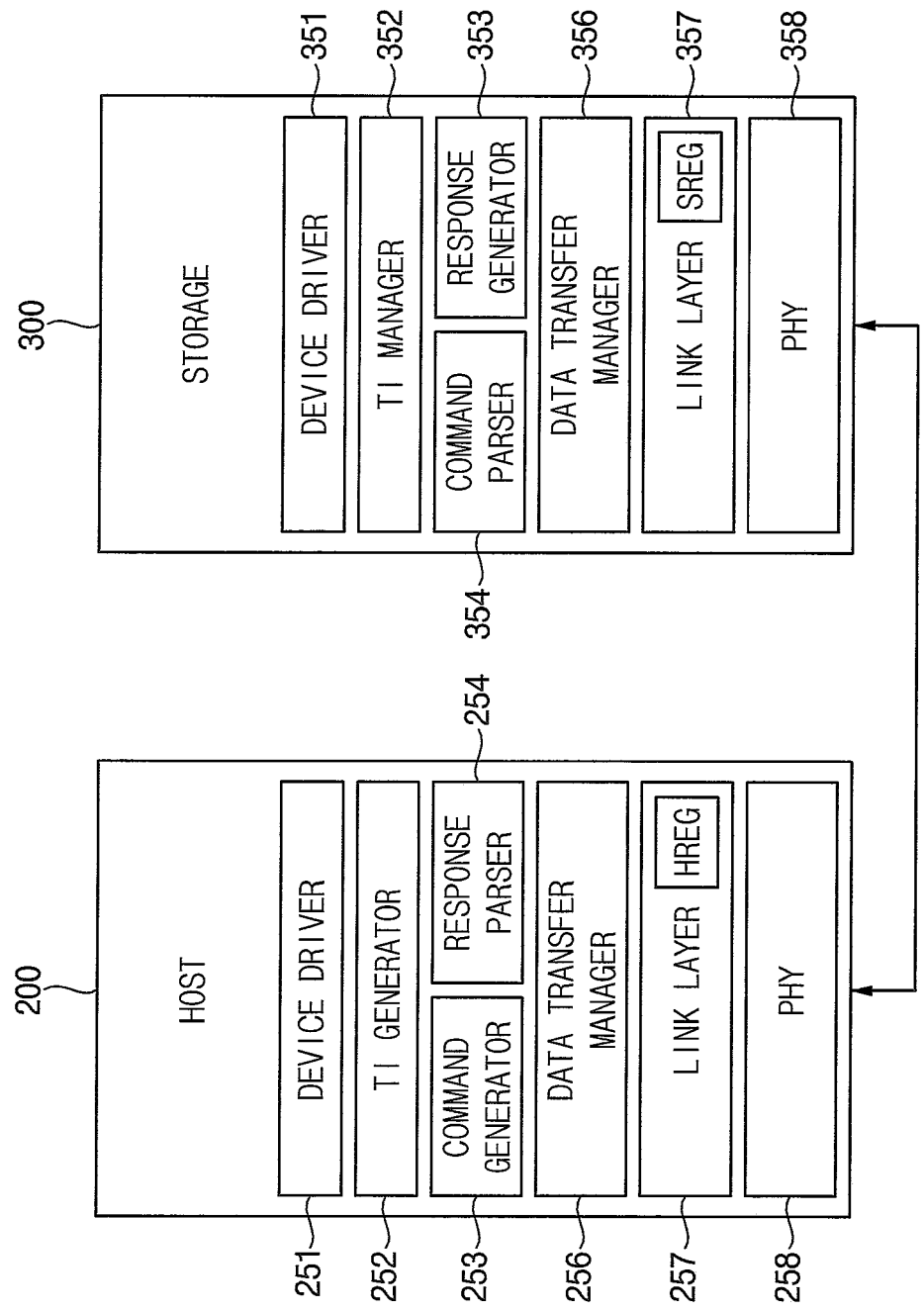
FIG. 3 is a diagram for describing an operation of a storage system according to example embodiments.

FIG. 3 is a diagram for describing an operation of a storage system according to example embodiments. FIG. 3 conceptually illustrates a software hierarchical structure of the host device 200 and the storage device 300 in FIG. 2.

Referring to FIG. 3, the host device 200 may include a device driver 251, a time information (TI) generator 252, a command generator 253, a response parser 254, a data transfer manager 256, a link layer 257 and a physical layer (PHY) 258.

The device driver 251 may control overall operations of the host device 200 to control the storage device 300. The TI generator 252 may generate the host time information of the host device 200. In some example embodiments, the TI generator 252 may generate the real time clock (RTC) as the host time information. The command generator 253 may generate commands to be transferred to the storage device 300. The response parser 254 may parse or decode responses received from the storage device 300. The data transfer manager 256 may generate packets of data to be transferred to the storage device 300. The link layer 257 may control data flow to the PHY 258 and perform recovery of data transfer errors. The PHY 258 may manage physical data communication with the storage device 300.

The host device 200 may further include an application and a file system. The application may be an application software program that is executed on an operating system. For example, the application has been programmed to aid in generating, copying and deleting a file. For example, the application may provide various services such as a video application, a game application, a web browser application, etc. The file system may manage files used by the host device 200. For example, the file system may manage file names, extensions, file attributes, file sizes, cluster information, etc. of files accessed by requests from the host device 200 or applications executed by the host device 200. The file system may generate, delete and manage data on a file basis. For example, the file system may be a flash-friendly file system (F2FS).

The application, the file system, etc. may be referred to as high level and the data transfer manager 256, the link layer 257, the PHY 258, etc. may be referred to as low level.

The storage device 300 may include a device driver 351, a time information (TI) manager 352, a response generator 353, a command parser 354, a data transfer manager 356, a link layer 357 and a physical layer (PHY) 358.

The device driver 351 may control overall operations of the storage device 300. The TI manager 352 may manage the storage time information of the storage device 300 based on the host time information provided from the host device 200. The response generator 353 may generate responses to be transferred to the host device 200. The command parser 354 may parse or decode commands received from the host device 200. The data transfer manager 356 may generate packets of data to be transferred to the host device 200. The link layer 357 may control data flow to the PHY 358 and perform recovery of data transfer errors. The PHY 358 may manage physical data communication with the host device 200.

The storage device 300 may further include a flash translation layer (FTL). The flash translation layer may perform various functions, such as an address mapping operation, a wear-leveling operation, a garbage collection operation, or the like. The address mapping operation may be an operation of converting a logical address received from the host device 200 into a physical address used to actually store data in a nonvolatile memory (e.g., the nonvolatile memories 320a, 320b and 320c in FIG. 2). The wear-leveling operation may be a technique for preventing excessive deterioration of a specific memory block by allowing blocks of the nonvolatile memory to be uniformly used. As an example, the wear-leveling operation may be implemented using a firmware technique that balances erase counts of physical memory blocks. The garbage collection operation may be a technique for ensuring usable capacity in the nonvolatile memory by erasing an existing memory block after copying valid data of the existing memory block to a new memory block.

In some example embodiments, the link layer 257 of the host device 200 and the link layer 357 of the storage device 300 may be implemented according to UniPro specification released by Mobile Industry Processor Interface (MIPI). In this case, the link layer 257 may include a register HREG to store the UniPro attributes of the host device 200, and the link layer 357 may include a register SREG to store the UniPro attributes of the storage device 300.

Figure 4:
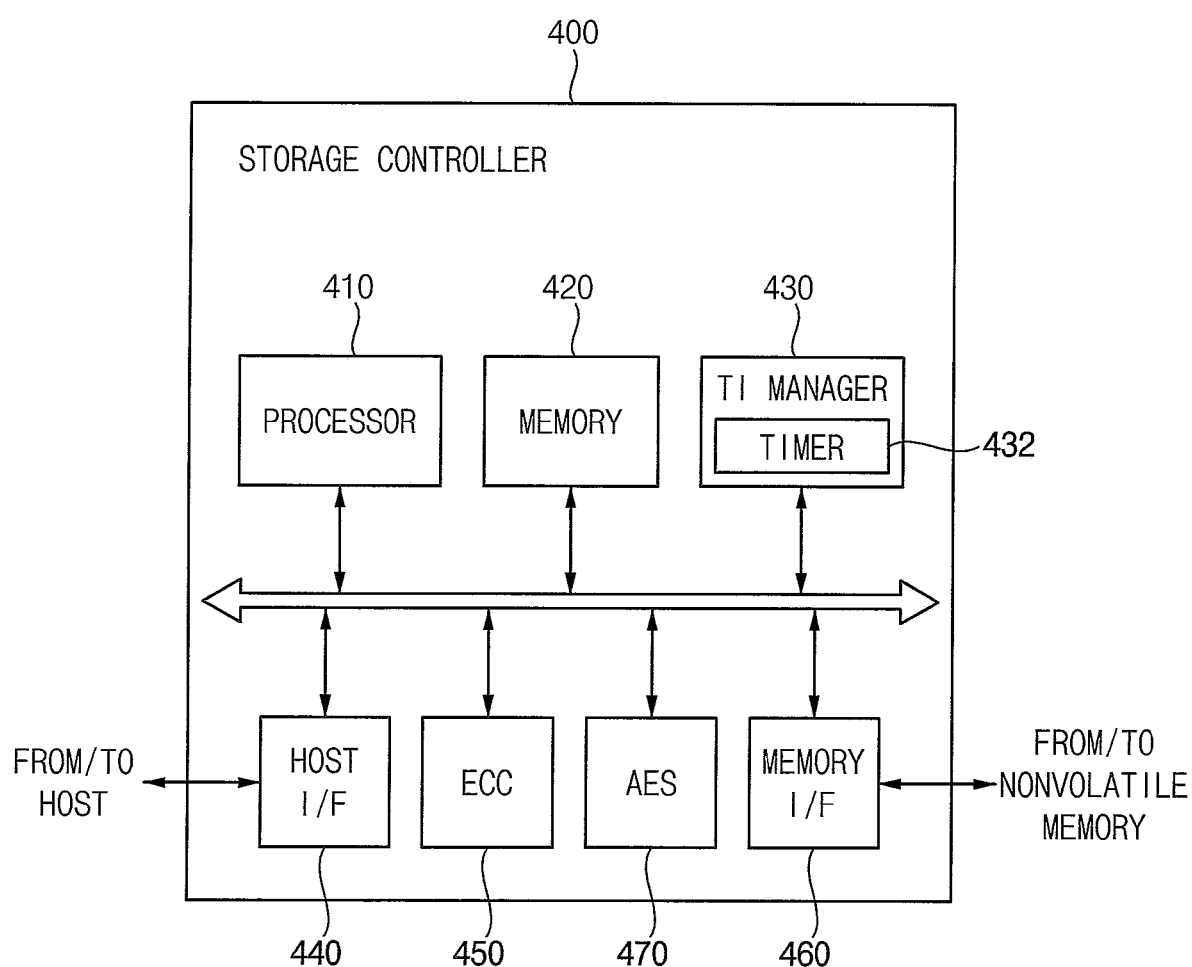
FIG. 4 is a block diagram illustrating a storage controller included in a storage system according to example embodiments.

FIG. 4 is a block diagram illustrating a storage controller included in a storage system according to example embodiments.

Referring to FIG. 4, a storage controller 400 may include a processor 410, a memory 420, a time information (TI) manager 430, a host interface 440, an error correction code (ECC) engine 450, a memory interface 460 and an advanced encryption standard (AES) engine 470. For example, the storage controller 400 may correspond to the storage controller 310 in FIG. 2.

The processor 410 may control an operation of the storage controller 400 in response to a command received via the host interface 440 from a host device (e.g., the host device 200 in FIG. 2). For example, the processor 410 may control an operation of a storage device (e.g., the storage device 300 of FIG. 2), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The TI manager 430 performing the time synchronization method according to example embodiments may determine the time synchronization interval in which the host time information of the host device 200 is required by the storage device 300, and synchronize the storage time information of the storage device 300 with the host time information provided from the host device 200. The time information manager 430 may compensate for the host time information provided from the host device 200 based on the local time provided from an embedded timer 432.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), an SATA, a nonvolatile memory (NVM) express (NVMe), etc., format.

The memory interface 460 may exchange data with a nonvolatile memory (e.g., the nonvolatile memories 320a, 320b and 320c in FIG. 2). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. For example, the memory interface 460 may be configured to comply with a standard protocol, such as Toggle or open NAND flash interface (ONFI).

The AES engine 470 may perform at least one of an encryption operation and a decryption operation on data input to the storage controller 400 using a symmetric-key algorithm. The AES engine 470 may include an encryption module and a decryption module. For example, the encryption module and the decryption module may be implemented as separate modules. For another example, one module capable of performing both encryption and decryption operations may be implemented in the AES engine 470.

Figure 5:
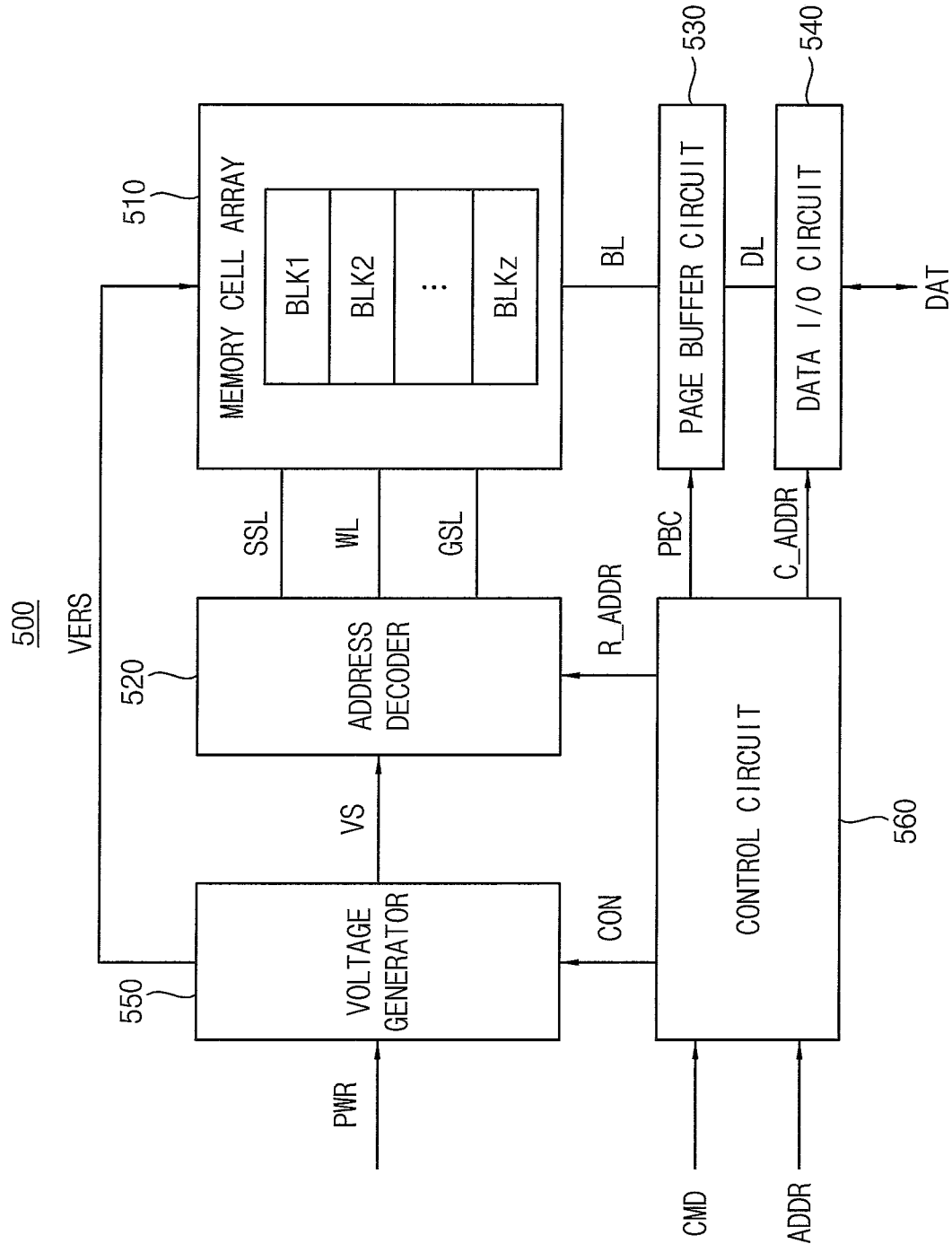
FIG. 5 is a block diagram illustrating an example of a nonvolatile memory device included in a storage device according to example embodiments.

FIG. 5 is a block diagram illustrating an example of a nonvolatile memory device included in a storage device according to example embodiments.

Referring to FIG. 5, a nonvolatile memory 500 includes a memory cell array 510, an address decoder 520, a page buffer circuit 530, a data I/O circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In some example embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 24.

The control circuit 560 receives a command CMD and an address ADDR from an outside (e.g., from the storage controller 310 in FIG. 2), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the remaining wordlines, other than the selected wordline, as unselected wordlines, based on the row address R_ADDR.

In addition, in the data erase/write/read operations, the address decoder 520 may determine at least one of the plurality of string selection lines SSL as a selected string selection line, and may determine the remaining string selection lines, other than the selected string selection line, as unselected string selection lines, based on the row address R_ADDR.

Further, in the data erase/write/read operations, the address decoder 520 may determine at least one of the plurality of ground selection lines GSL as a selected ground selection line, and may determine the remaining ground selection lines, other than the selected ground selection line, as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage that is required for the data erase operation based on the power PWR and the control signals CON. The erase voltage may be applied to the memory cell array 510 directly or via the bitline BL.

For example, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed (i.e., read) from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory is described based on a NAND flash memory, example embodiments are not limited thereto, and the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 6:
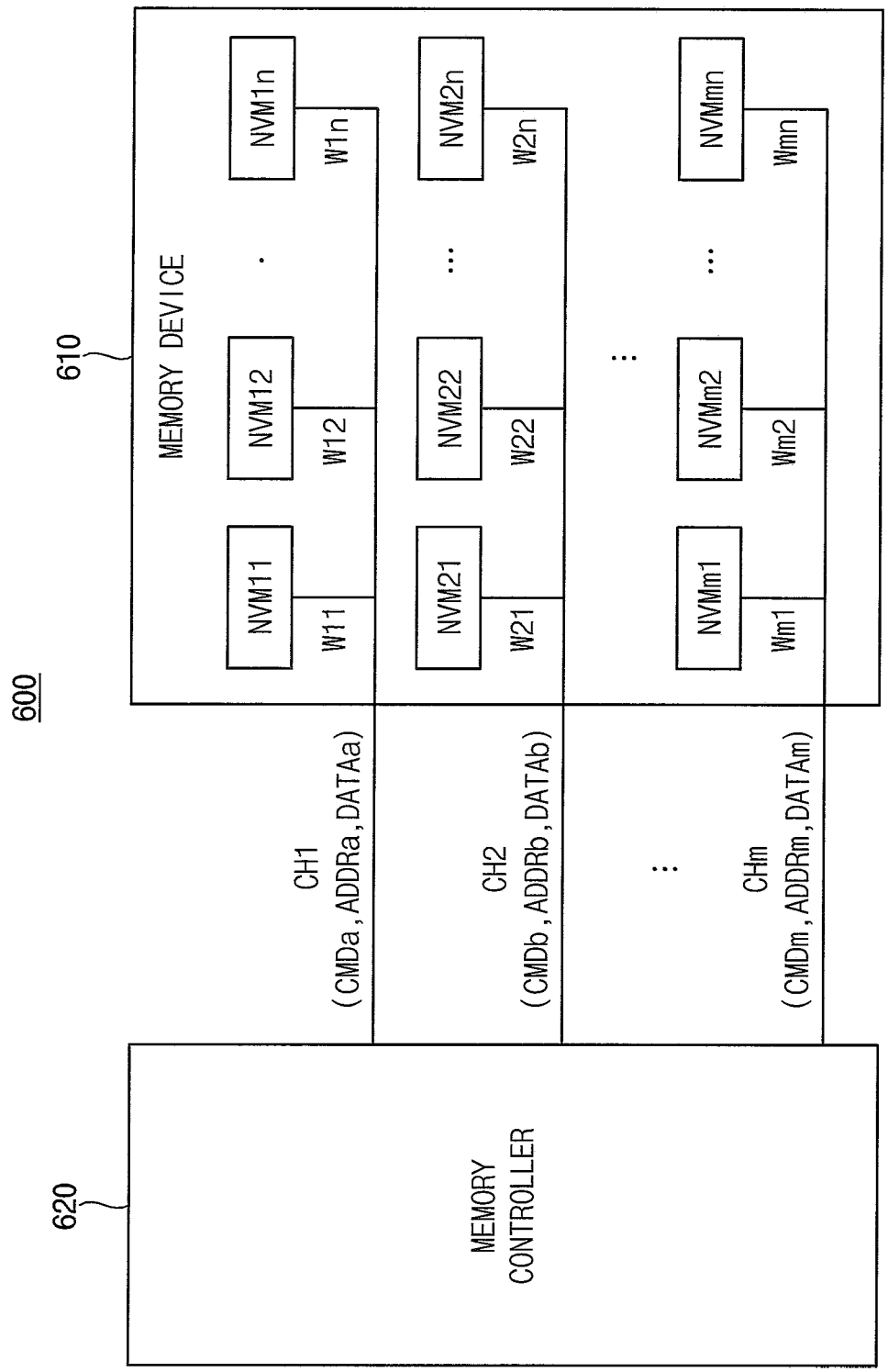
FIG. 6 is a block diagram illustrating a memory system including a nonvolatile memory device according to example embodiments.

FIG. 6 is a block diagram illustrating a memory system including a nonvolatile memory device according to example embodiments.

Referring to FIG. 6, a memory system 600 may include a memory device 610 and a memory controller 620. The memory system 600 may support a plurality of channels CH1, CH2, . . . , CHm, and the memory device 610 may be connected to the memory controller 620 through the plurality of channels CH1 to CHm. For example, the memory system 600 may be implemented as a storage device, such as a universal flash storage (UFS), a solid state drive (SSD), or the like.

The memory device 610 may include a plurality of nonvolatile memories NVM11, NVM12, . . . , NVM1n, NVM21, NVM22, . . . , NVM2n, NVMm1, NVMm2, . . . , NVMmn. For example, the nonvolatile memories NVM11 to NVMmn may correspond to the nonvolatile memories 320a, 320b and 320c in FIG. 2. Each of the nonvolatile memories NVM11 to NVMmn may be connected to one of the plurality of channels CH1 to CHm through a way corresponding thereto. For instance, the nonvolatile memories NVM11 to NVM1n may be connected to the first channel CH1 through ways W11, W12, . . . , W1n, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, . . . , Wmn. In some example embodiments, each of the nonvolatile memories NVM11 to NVMmn may be implemented as a memory unit that may operate according to an individual command from the memory controller 620. For example, each of the nonvolatile memories NVM11 to NVMmn may be implemented as a chip or a die, but example embodiments are not limited thereto.

The memory controller 620 may transmit and receive signals to and from the memory device 610 through the plurality of channels CH1 to CHm. For example, the memory controller 620 may correspond to the storage controller 310 in FIG. 2. For example, the memory controller 620 may transmit commands CMDa, CMDb, . . . , CMDm, addresses ADDRa, ADDRb, . . . , ADDRm and data DATAa, DATAb, . . . , DATAm to the memory device 610 through the channels CH1 to CHm, or may receive the data DATAa to DATAm from the memory device 610 through the channels CH1 to CHm.

The memory controller 620 may select one of the nonvolatile memories NVM11 to NVMmn, which is connected to each of the channels CH1 to CHm, using a corresponding one of the channels CH1 to CHm, and may transmit and receive signals to and from the selected nonvolatile memory. For example, the memory controller 620 may select the nonvolatile memory NVM11 from among the nonvolatile memories NVM11 to NVM1n connected to the first channel CH1. The memory controller 620 may transmit the command CMDa, the address ADDRa and the data DATAa to the selected nonvolatile memory NVM11 through the first channel CH1 or may receive the data DATAa from the selected nonvolatile memory NVM11 through the first channel CH1.

The memory controller 620 may transmit and receive signals to and from the memory device 610 in parallel through different channels. For example, the memory controller 620 may transmit the command CMDb to the memory device 610 through the second channel CH2 while transmitting the command CMDa to the memory device 610 through the first channel CH1. For example, the memory controller 620 may receive the data DATAb from the memory device 610 through the second channel CH2 while receiving the data DATAa from the memory device 610 through the first channel CH1.

The memory controller 620 may control overall operations of the memory device 610. The memory controller 620 may transmit a signal to the channels CH1 to CHm and may control each of the nonvolatile memories NVM11 to NVMmn connected to the channels CH1 to CHm. For example, the memory controller 620 may transmit the command CMDa and the address ADDRa to the first channel CH1 and may control one selected from among the nonvolatile memories NVM11 to NVM1n.

Each of the nonvolatile memories NVM11 to NVMmn may operate under the control of the memory controller 620. For example, the nonvolatile memory NVM11 may program the data DATAa based on the command CMDa, the address ADDRa and the data DATAa provided from the memory controller 620 through the first channel CH1. For example, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

Although FIG. 6 illustrates an example where the memory device 610 communicates with the memory controller 620 through m channels and includes n nonvolatile memories corresponding to each of the channels, example embodiments are not limited thereto and the number of channels and the number of nonvolatile memories connected to one channel may be variously changed.

Hereinafter, example embodiments will be described in detail based on an example where the storage device is a UFS. However, example embodiments are not limited thereto, and example embodiments may be applied or employed to various storage devices such as SSD.

Figure 7:
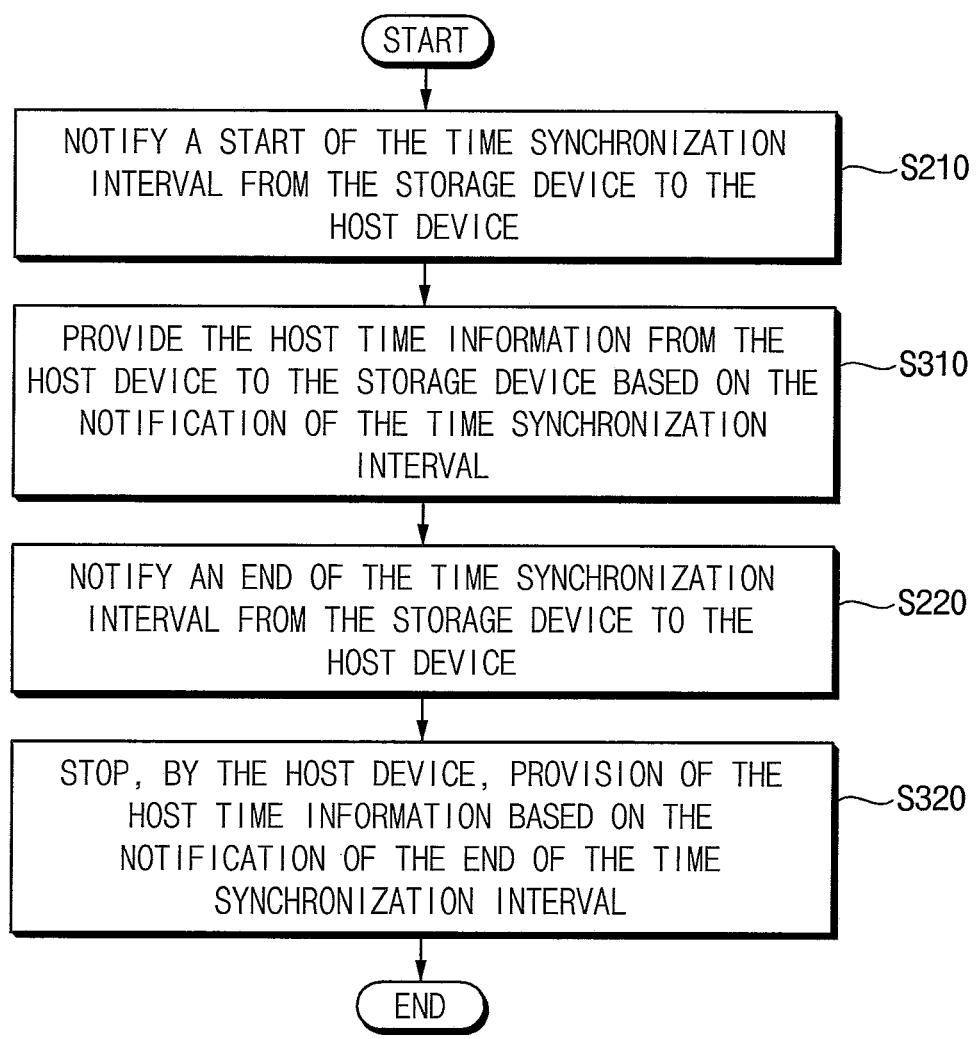
FIG. 7 is a flowchart illustrating a time synchronization method according to example embodiments.

FIG. 7 is a flowchart illustrating a time synchronization method according to example embodiments.

Referring to FIGS. 2 through 7, the storage device 300 may notify a start of the time synchronization interval to the host device 200 (S210). The host device 200 may provide the host time information to the storage device 300 during the time synchronization interval based on the notification of the star of the time synchronization interval (S310). In addition, the storage device (300) may notify an end of the time synchronization interval to the host device (S220). The host device 200 may stop provision of the host time information based on the notification of the end of the time synchronization interval (S320).

In some example embodiments, as will be described below with reference to FIGS. 8 through 19, the time synchronization interval may be notified from the storage device to the host device and the host time information may be provided from the host device to the storage device, using universal flash storage (UFS) protocol information units (UPIUs) according to UFS standards.

In some example embodiments, as will be described below with reference to FIGS. 20 and 21, the time synchronization interval may be notified from the storage device to the host device and the host time information may be provided from the host device to the storage device, using UniPro attributes of the host device or the storage device according to the UFS standards.

Figure 8:
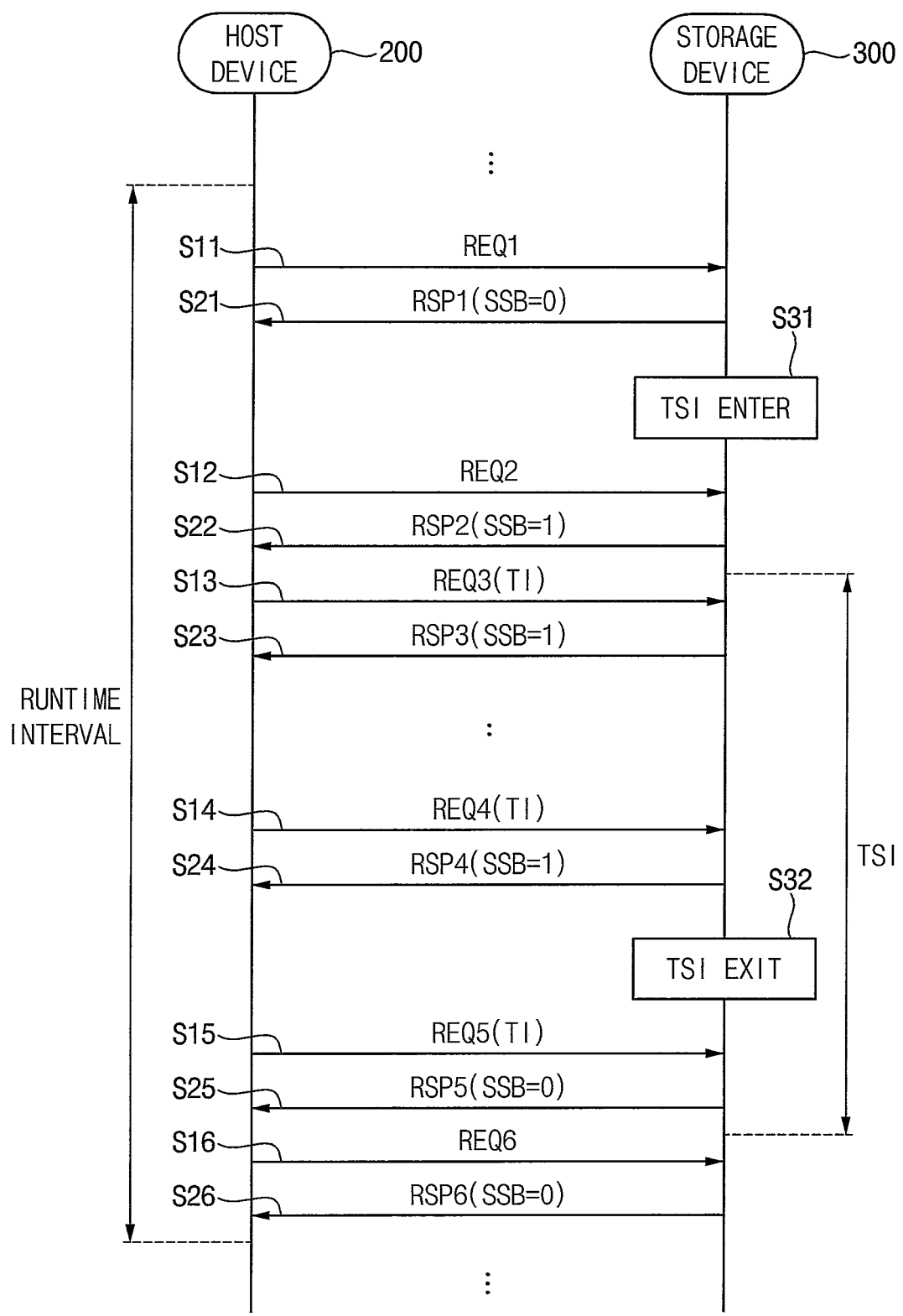
FIG. 8 is a diagram illustrating an example sequence of a time synchronization method according to example embodiments.

FIG. 8 is a diagram illustrating an example of a sequence of a time synchronization method according to example embodiments.

FIG. 8 illustrates first through sixth request UPIUs REQ1~REQ6 and first through sixth response UPIUs RSP1~RSP6 transferred between the host device 200 and the storage device 300 during the runtime interval of the storage device 300. The UPIU according to the UFS standards will be described below.

Referring to FIG. 8, the host device 200 may transfer the first request UPIU REQ1 to the storage device 300 (S11), and the storage device 300 may transfer the first response UPIU RSP1 corresponding to the first request UPIU REQ1 to the host device 200 (S21). For example, a synchronization setting bit SSB included in the first response UPIU RSP1 may have a second value (e.g., a value of '0').

The storage device 300 may determine a start (TSI ENTER) of a time synchronization interval TSI in which the host time information of the host device 200 is required by the storage device 300 (S31).

The host device 200 may transfer the second request UPIU REQ2 to the storage device 300 (S12), and the storage device 300 may transfer the second response UPIU RSP2 corresponding to the second request UPIU REQ2 to the host device 200 (S22). In this case, the storage device 300 may set the synchronization setting bit SSB included in the second response UPIU RSP2 to a first value (e.g., a value of '1') to notify the start of the time synchronization interval TSI to the host device 200.

The host device 200 may transfer the third request UPIU REQ3 to the storage device 300 (S13), and the storage device 300 may transfer the third response UPIU RSP3 corresponding to the third request UPIU REQ3 to the host device 200 (S23). In this case, the host device 200 may transfer the third request UPIU REQ3 including the host time information TI based on the notification of start of the time synchronization interval TSI by the second response UPIU RSP2. The storage device 300 may set the synchronization setting bit SSB included in the third response UPIU RSP3 to the first value to notify that the time synchronization interval TSI is maintained.

The host device 200 may transfer the fourth request UPIU REQ4 to the storage device 300 (S14), and the storage device 300 may transfer the fourth response UPIU RSP4 corresponding to the fourth request UPIU REQ4 to the host device 200 (S24). In this case, the host device 200 may transfer the fourth request UPIU REQ4 including the host time information TI based on the notification of the maintenance of the time synchronization interval TSI by the third response UPIU RSP3. The storage device 300 may set the synchronization setting bit SSB included in the fourth response UPIU RSP4 to the first value to notify that the time synchronization interval TSI is maintained.

The storage device 300 may determine an end (TSI EXIT) of the time synchronization interval TSI (S32).

The host device 200 may transfer the fifth request UPIU REQ5 to the storage device 300 (S15), and the storage device 300 may transfer the fifth response UPIU RSP5 corresponding to the fifth request UPIU REQ5 to the host device 200 (S25). In this case, the storage device 300 may set the synchronization setting bit SSB included in the fifth response UPIU RSP5 to the first value to notify the end of the time synchronization interval TSI to the host device 200.

The host device 200 may transfer the sixth request UPIU REQ6 to the storage device 300 (S16), and the storage device 300 may transfer the sixth response UPIU RSP6 corresponding to the sixth request UPIU REQ6 to the host device 200 (S26). In this case, the host device 200 may transfer the sixth request UPIU REQ6, which does not include the host time information TI, based on the notification of the end of the time synchronization interval TSI by the fifth response UPIU RSP5. The storage device 300 may set the synchronization setting bit SSB included in the fourth response UPIU RSP4 to the second value to notify that the time synchronization interval TSI is not started.

As such, the storage device 300 may notify the time synchronization interval TSI to the host device 200 through the start notification by the second response UPIU RSP2 and the end notification by the fifth response UPIU RSP5. The host device 200 may transfer the host time information TI only during the time synchronization interval TSI that is determined by the storage device 300 to reduce the overhead of the time information transfer, and thus the storage system 100 including the host device 200 and the storage device 300 may be enhanced.

Hereinafter, example embodiments are described based on the storage system 100 in which the host device 200 and the storage device 300 communicate with each other according to the UFS standards. The UFS standards may be incorporated by reference herein in its entirety and the descriptions in this disclosure may by supported by the USF standards.

FIG. 9 is a diagram illustrating a UFS protocol information unit (UPIU) used in a time synchronization method according to example embodiments.

FIG. 9 illustrates a general format of the UPIU according to UFS standards. The UPIU include a plurality of fields, and byte numbers 0~j+3 and names of the plurality of fields are illustrated in FIG. 9. For example, the UPIU may include the fields such as Transaction Type, Flags, LUN, Task Tag, IID, Command Set Type, Query Function/Task Manag. Funtion, Response, Total EHS Length, Device Information, Data Segment Length, Transaction Specific Fields, Extra Header Segment (EHS)~Extra Header Segment (EHS)N, Header E2ECRC, Data Segment, Data E2ECRC, etc. The descriptions may be replaced with the descriptions in the published UFS standards.

The time synchronization interval TSI may be notified from the storage device 300 to the host device 200 and the host time information TI may be provided from the host device 200 to the storage device 300, using the UPIU as illustrated in FIG. 9 according to the UFS standards.

FIGS. 10 and 11 are diagrams illustrating an example of notifying a time synchronization interval by a time synchronization method according to example embodiments.

FIG. 10 illustrates a header portion of a response UPIU and FIG. 11 illustrates an example of a device information field FLD1 included in the response UPIU of FIG. 10 according to example embodiments.

Referring to FIGS. 10 and 11, the first bit B[0] named EVENT_ALERT of the device information field FLD1 is used already to alert an exception event from the storage device 300 to the host device 200 according to the UFS standards. When the first bit B[0] has the value of '1', the host device 200 may transfer a UPIU to the storage device 300 so as to check the event indicated by the alert.

The second through eighth bits B[1:7] of the device information field FLD1 are reserved bits according to the UFS standards. According to example embodiments, one of the reserved bits may be used as the synchronization setting bit SSB to notify the time synchronization interval TSI as described with reference to FIG. 8. FIG. 11 illustrates an example embodiment in which the second bit B[1] named TIME_REQUEST is used as the synchronization setting bit SSB. For example, the first value (e.g., the value of '1') of the second bit B[1] may indicate the start of the time synchronization interval TSI and the second value (e.g., the value of '0') may indicate the end of the time synchronization interval TSI.

As described with reference to FIGS. 8 through 11, the start of the time synchronization interval TSI may be notified from the storage device 300 to the host device 200 by setting the synchronization setting bit SSB to the first value and the synchronization setting bit SSB may be included in the device information field of the response UPIU that is transferred from the storage device 300 to the host device 200. In addition, the end of the time synchronization interval TSI may be notified from the storage device 300 to the host device 200 by setting the synchronization setting bit SSB to the second value.

FIGS. 12, 13A and 13B are diagrams illustrating an example of providing time information by a time synchronization method according to example embodiments. FIGS. 12, 13A and 13B illustrates an example embodiment in which the host time information TI is provided from the host device 200 to the storage device 300 using a command UPIU that is a request UPIU. According to example embodiments, the host time information TI may be provided using any request UPIU according to the UFS standards. For example, the host time information TI may be provided using a data output UPIU.

FIG. 12 illustrates a format of the command UPIU that does not include the host time information TI. For example, the command UPIU in FIG. 12 may correspond to the first request UPIU REQ1, the second request UPIU REQ2 and the sixth request UPIU REQ6 in FIG. 8. As illustrated in FIG. 12, the command UPIU without the host time information TI may not include the extra header segment (EHS) and the value of the Total EHS Length field FLD2 may be set to '00 h'.

FIG. 13A illustrates a format of the command UPIU that includes the host time information TI. For example, the command UPIU in FIG. 13A may correspond to the third request UPIU REQ3, the fourth request UPIU REQ4 and the fifth request UPIU REQ5 in FIG. 8. As illustrated in FIG. 13A, the command UPIU with the host time information TI may include the extra header segment FLD3 and the value of the Total EHS Length field FLD2 may be set to a value indicating the length of the extra header segment FLD3. FIG. 13A illustrates an example that the length of the extra header segment FLD3 is 8 bytes. In this case, the length may be set by units of 4 bytes and the value of the Total EHS Length field FLD2 may be set to '02 h' indicating that the host time information TI is included in the first extra header segment EHS1 of four bytes and the second extra header segment EHS2 of four bytes.

As illustrated in FIG. 13B, a value (e.g., 45312358 . . . ) indicating the host time information TI that corresponds to a predetermined time resolution may be included in bytes 32:39 of the extra header segment FLD3 of the request UPIU. In other words, the host time information TI may be provided from the host device 200 to the storage device 300 by adding the host time information TI of the predetermined time resolution in the extra header segment FLD3 of the request UPIU.

As such, example embodiments may further reduce the overhead of transferring the host time information TI, by transferring the host time information TI using the established signals without additional signals for the time information transfer.

Figure 14:
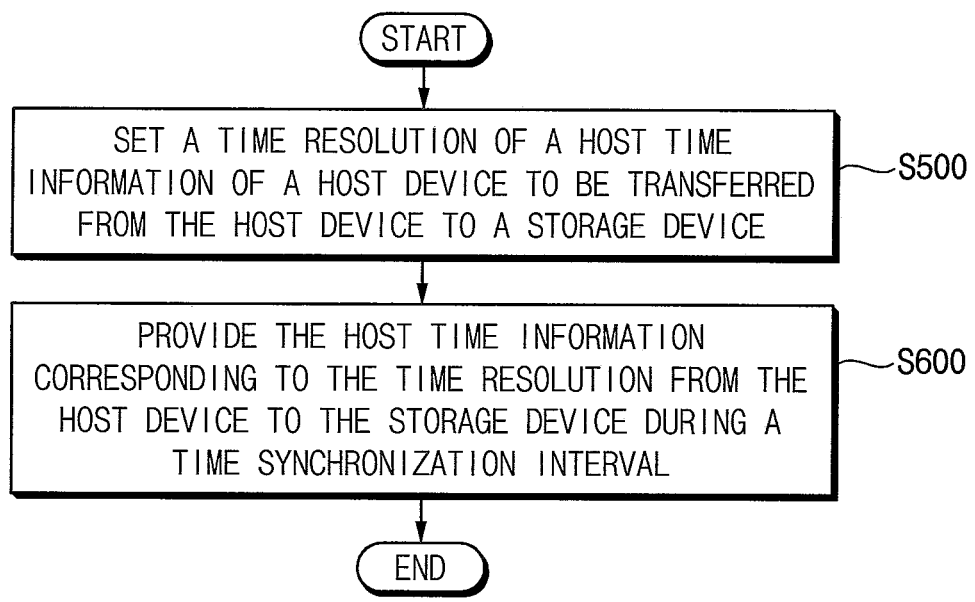
FIG. 14 is a flowchart illustrating a time synchronization method according to example embodiments.

FIG. 14 is a flowchart illustrating a time synchronization method according to example embodiments.

Referring to FIG. 14, the time resolution of the host time information TI to be transferred from the host device 200 to the storage device 300 may be set in advance (S500). The host time information TI corresponding to the time resolution may be provided from the host device 200 to the storage device 300 during a time synchronization interval TSI (S600).

In some example embodiments, as will be described below with reference to FIG. 15 through 19, the time resolution may be set using the UPIU according to the UPIU standards.

In some example embodiments, as will be described below with reference to FIGS. 20 and 21, the time resolution may be set using the UniPro attributes according to the UPIU standards.

Figure 15:
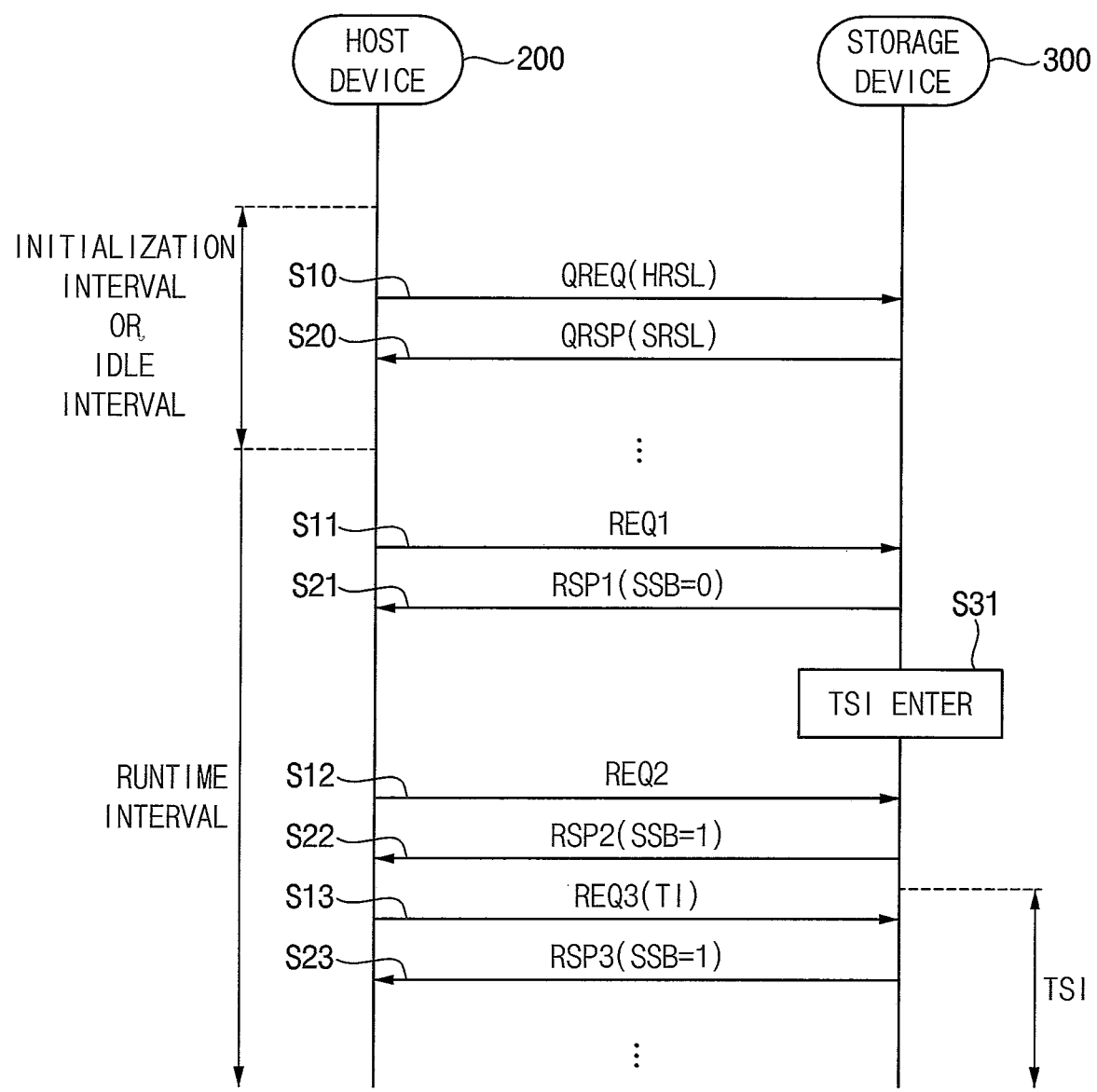
FIG. 15 is a diagram illustrating an example sequence of a time synchronization method according to example embodiments.

FIG. 15 is a diagram illustrating an example of a sequence of a time synchronization method according to example embodiments, and FIGS. 16A, 16B and 17 are diagrams illustrating an example of setting a time resolution by a time synchronization method according to example embodiments.

The operations S11, S21, S31, S12, S22, S13 and S23 performed during the runtime interval are the same as described with reference to FIG. 8, and the repeated descriptions are omitted.

FIG. 15 illustrates a query request UPIU QREQ and a query response UPIU QRSP transferred between the host device 200 and the storage device 300 during the initialization interval or the idle interval of the storage device 300 according to the UFS standards.

Referring to FIG. 15, the host device 200 may transfer the query request UPIU QREQ to the storage device 300 (S10), and the storage device 300 may transfer the query response UPIU QRSP corresponding to the query request UPIU QREQ to the host device 200 (S20). The host device 200 may add a time resolution HRSL, which is implemented by the host device 200, in the query request UPIU QREQ, and the storage device 300 may add a time resolution SRSL, which is supported by the storage device 300, in the query response UPIU QRSP.

As such, the time resolution of the host time information TI may be set using the query request UPIU QREQ that is transferred from the host device 200 to the storage device 300 and the query response UPIU QRSP that is transferred from the storage device 300 to the host device 200.

FIG. 16A illustrates a format of the query request UPIU QREQ that is transferred from the host device 200 to the storage device 300, and FIG. 16B illustrates a format of the query response UPIU QRSP that is transferred from the storage device 300 to the host device 200. FIG. 17 illustrates an example of UFS attributes indicating the time resolution according to example embodiments. The detailed descriptions of the formats of the query request UPIU QREQ and the query response UPIU QRSP may be replaced with the descriptions of FIG. 9 and the UFS standards.

The UFS attributes indicating the time resolution may be defined using identification numbers IDN that reserved according to the UFS standards. For example, as illustrated in FIG. 17, a device time resolution attribute named bDeviceTimeResolution may be defined at the identification number of '20 h' and a host time resolution attribute named bHostTimeResolution may be defined at the identification number of '21 h'. Each of the device time resolution attribute and the host time resolution attribute may have a size of one byte. The device time resolution attribute may have a property of Read Only such that the device time resolution attribute may be provided only from the storage device 300 to the host device 200. In contrast, the host time resolution attribute may have a property of Read/Write such that the host time resolution attribute may be provided from the host device 200 to the storage device 300, or from the storage device 300 to the host device 200.

Each of the device time resolution attribute and the host time resolution attribute may include bits bit[0]~bit[3] indicating whether to enable various time resolutions such as nanosecond (ns), microsecond (us), millisecond (ms), second (s), etc.

As such, the device time resolution attribute and the host time resolution attribute may be included in the Transaction Specific Fields of the query request UPIU QREQ of FIG. 16A and the response UPIU QRSP of FIG. 16B according to the UFS standards and transferred between the host device 200 and the storage device 300.

Figure 18:
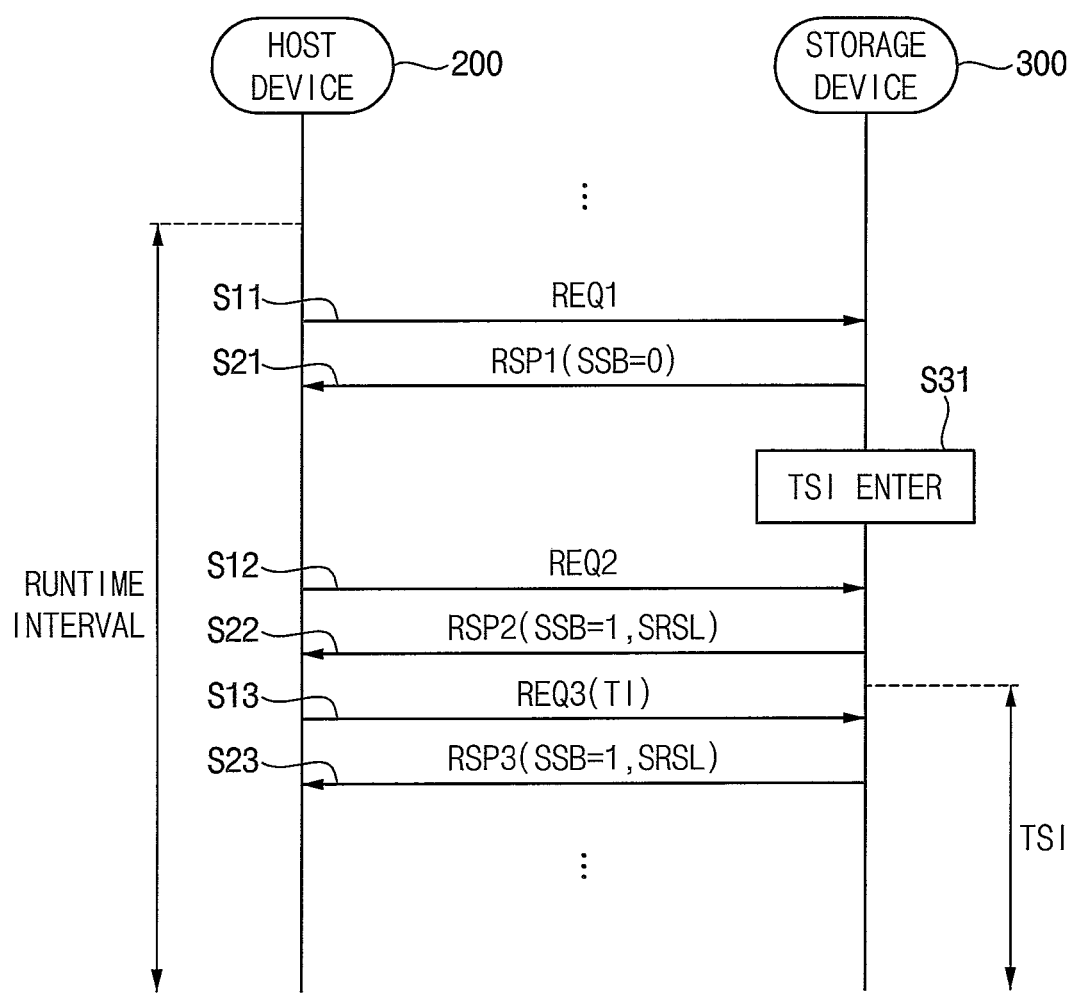
FIG. 18 is a diagram illustrating an example sequence of a time synchronization method according to example embodiments.

FIG. 18 is a diagram illustrating an example of a sequence of a time synchronization method according to example embodiments.

The operations S11, S21, S31, S12, S22, S13 and 23 performed during the runtime interval are the same as described with reference to FIG. 8 except the time resolution, and the repeated descriptions are omitted.

Referring to FIG. 18, the second response UPIU RSP2 and the third response UPIU RSP3 may include the time resolution SRSL supported by the storage device 300 in addition to the synchronization setting bit SSB as described above. The time resolution may be set during the runtime interval according to example embodiments of FIGS. 18 and 19, whereas the time resolution is set during the initialization interval or the idle interval according to example embodiments of FIGS. 15 through 17.

FIG. 19 is a diagram illustrating an example of setting a time resolution by a time synchronization method according to example embodiments.

FIG. 19 illustrates an example of the device information field FLD1 included in the response UPIU of FIG. 10 according to example embodiments.

Referring to FIGS. 10 and 19, the first bit B[0] named EVENT_ALERT of the device information field FLD1 is used already to alert exception event from the storage device 300 to the host device 200 according to the UFS standards. When the first bit B[0] has the value of '1', the host device 200 may transfer a UPIU to the storage device 300 so as to check the event indicated by the alert.

The second through eighth bits B[1:7] of the device information field FLD1 are reserved bits according to the UFS standards. According to example embodiments, one of the reserved bits may be used as the synchronization setting bit SSB to notify the time synchronization interval TSI as described with reference to FIG. 8. In addition, at least one of the reserved bits may be used for the time resolution. FIG. 19 illustrates an example embodiment in which the second bit B[1] named TIME_REQUEST is used as the synchronization setting bit SSB and the third through sixth bits B[2:5] are used for setting the time resolution as described with reference to FIG. 17.

Figure 20:
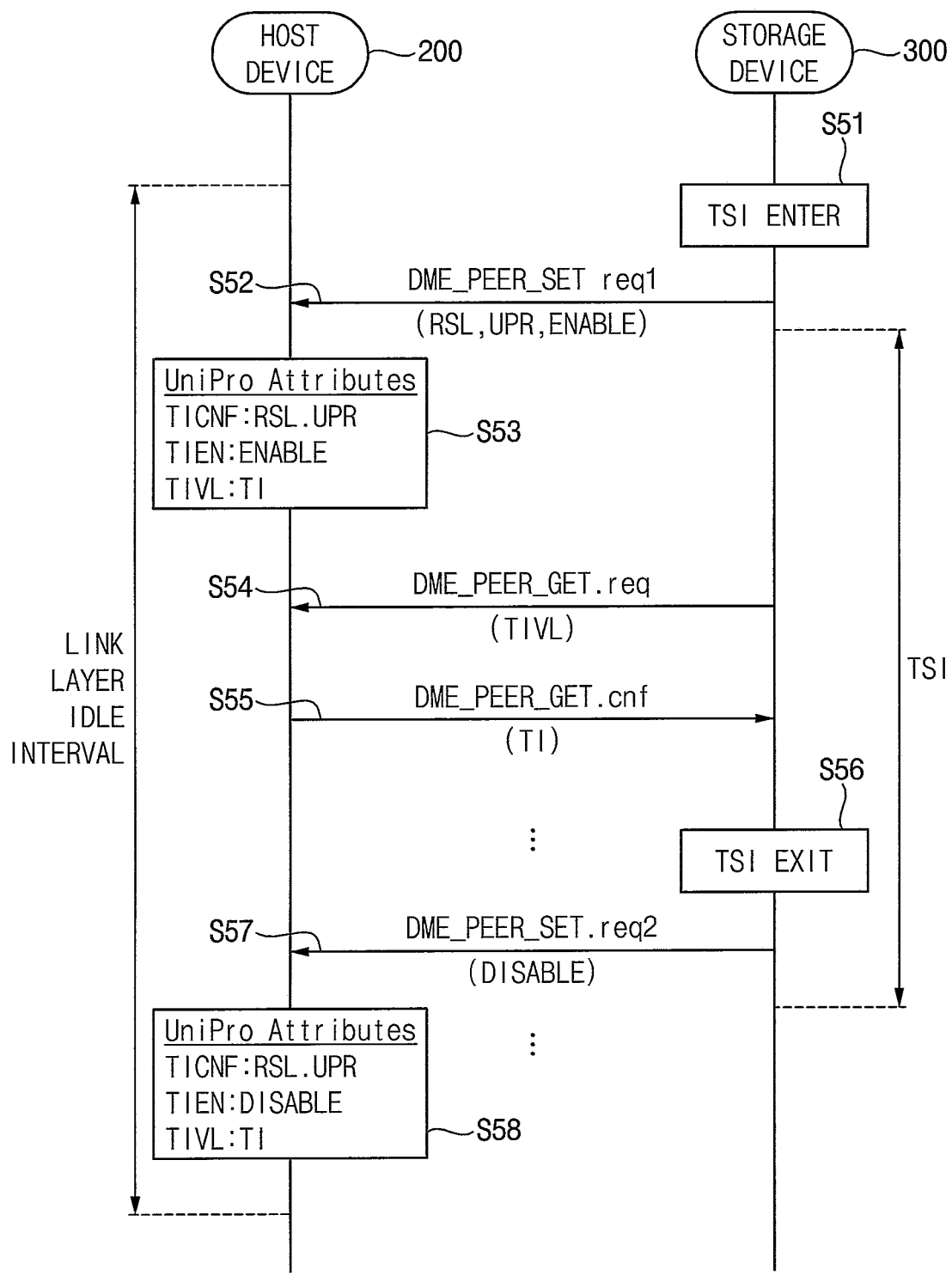
FIGS. 20 and 21 are diagrams illustrating example sequences of a time synchronization method according to example embodiments.
Figure 21:
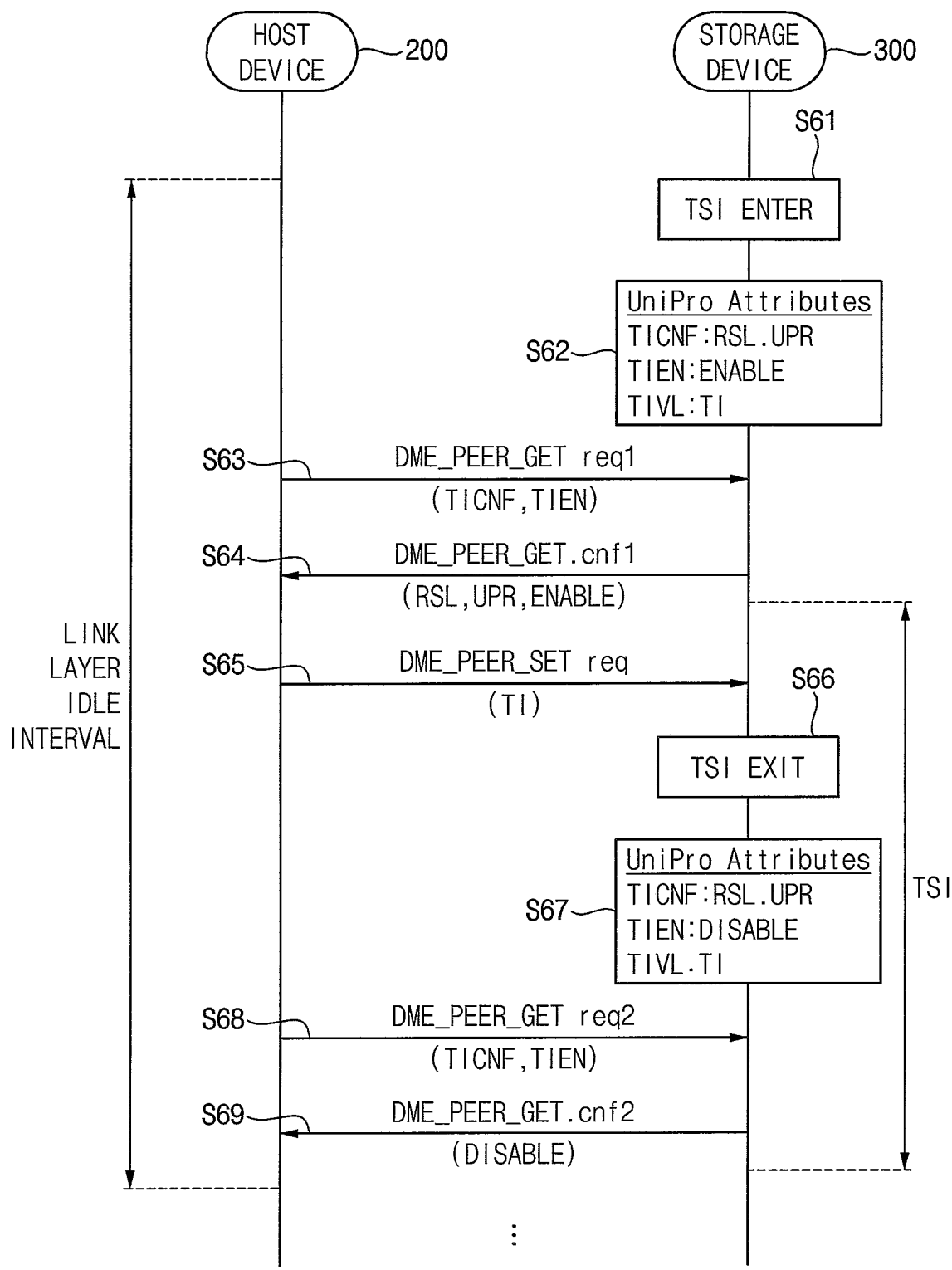

FIGS. 20 and 21 are diagrams illustrating example sequences of a time synchronization method according to example embodiments.

FIGS. 20 and 21 illustrate service primitives according to the UFS standards, which are transferred between the host device 200 and the storage device 300 during the link layer idle interval.

Referring to FIGS. 20 and 21, a time information configuration attribute TICNF, a time information enable attribute TIEN and a time information attribute TIVL may be set among UniPro attributes of the host device 200 or the storage device 300 according to the UFS standards. The UniPro attributes of the host device 200 and the storage device 300 may be stored in the registers HREG and SREG in FIG. 3.

The time information configuration attribute TICNF may indicate a time resolution RSL and an updating period UPR of the host time information TI transferred from the host device 200 to the storage device 300. The time information enable attribute TIEN may indicate the time synchronization interval TSI as described above. The time information attribute TIVL may indicate the host time information TI.

FIG. 20 illustrates an example of a time synchronization method using the UniPro attributes of the host device 200 according to example embodiments.

Referring to FIG. 20, the storage device 300 may determine the time synchronization interval TSI in which the host time information TI is required by the storage device 300 (S51).

The storage device 300 may transfer a first set request service primitive DME_PEER_SET.req1 indicating a start of the time synchronization interval TSI to the host device 200 (S52). The first set request service primitive DME_PEER_SET.req1 may include the time resolution RSL and the updating period UPR of the host time information TI and a first value ENABLE indicating the start notification of the time synchronization interval TSI.

The host device 200 may set the time information enable attribute TIEN to the first value ENABLE based on the first set request service primitive DME_PEER_SET.req1 (S53). In addition, the host device 200 may set the time information configuration attribute TICNF with the time resolution RSL and the updating period UPR based on the first set request service primitive DME_PEER_SET.req1.

The host device 200 may refer to the values of the time information configuration attribute TICNF and store the host time information TI in the time information attribute TIVL. The host device 200 may refer to the values of the time information configuration attribute TICNF only while the time information enable attribute has the first value ENABLE to periodically update the host time information TI, that is, the value of the time information attribute TIVL periodically by the updating period UPR.

The storage device 300 may transfer a get request service primitive DME_PEER_GET.req requesting the host time information TSI, that is, the value of the time information attribute TIVL to the host device 200 (S54).

The host device 200 may transfer a get response service primitive DME_PEER_GET.cnf including the value of the time information attribute TIVL to the storage device 300 based on the get request service primitive DME_PEER_GET.req (S55).

The storage device 300 may determine an end of the time synchronization interval TSI (S56).

The storage device 300 may transfer a second set request service primitive DME_PEER_SET.req2 indicating the end of the time synchronization interval TSI to the host device 200 (S57). The second set request service primitive DME_PEER_SET.req2 may include a second value DISABLE indicating the end notification of the time synchronization interval TSI.

The host device 200 may set the time information enable attribute TIEN to the second value DISABLE based on the second set request service primitive DME_PEER_SET.req2. The host device 200 may stop updating of the host time information TI of the time information attribute TIVL while the time information enable attribute TIEN is set to the second value DISABLE.

FIG. 21 illustrates an example of a time synchronization method using the UniPro attributes of the storage device 300 according to example embodiments.

Referring to FIG. 21, the storage device 300 may determine the time synchronization interval TSI in which the host time information TI is required by the storage device 300 (S61).

The storage device 300 may set the time information enable attribute TIEN to the first value ENABLE (S62). In addition, the storage device 300 may set the time information configuration attribute TICNF with the time resolution RSL and the updating period UPR.

The host device 200 may transfer a first get request service primitive DME_PEER_GET.req1 requesting the value of the time information enable attribute TIEN to the storage device 300 (S63). In addition, the host device 200 may request the values of the time information configuration attribute TICNF through the first get request service primitive DME_PEER_GET.req1.

The storage device 300 may transfer a first get response service primitive DME_PEER_GET.cnf1 including the first value ENABLE of the time information enable attribute TIEN to the host device 200 based on the first get request service primitive DME_PEER_GET.req1 (S64). In addition, the storage device 300 may transfer the values of the time information configuration attribute TICNF, that is, the time resolution RSL and the updating period UPR through the first get response service primitive DME_PEER_GET.cnf1.

When the value of the time information enable attribute TIEN included in the first get response service primitive DME_PEER_GET.cnf1 is the first value ENABLE, the host device 200 may transfer a set request service primitive DME_PEER_SET.req including the host time information TI to the storage device 300 (S65).

The storage device 300 may update the value of the time information attribute TIVL based on the host time information TI included in the set request service primitive DME_PEER_SET.req.

The operation S63, S64 and S65 may be repeated periodically by the updating period UPR during the time synchronization interval TSI.

The storage device 300 may determine an end of the time synchronization interval TSI (S66), and the storage device 300 may set the time information enable attribute TIEN to the second value DISABLE (S67).

The host device 200 may transfer a second get request service primitive DME_PEER_GET.req2 requesting the value of the time information enable attribute TIEN to the storage device 300 (S68). In addition, the host device 200 may request the values of the time information configuration attribute TICNF through the second get request service primitive DME_PEER_GET.req2.

The storage device 300 may transfer a second get response service primitive DME_PEER_GET.cnf2 including the second value DISABLE of the time information enable attribute TIEN to the host device 200 based on the second get request service primitive DME_PEER_GET.req2 (S69).

When the value of the time information enable attribute TIEN included in the second get response service primitive DME_PEER_GET.cnf2 is the first value ENABLE, the host device 200 may stop transferring the host time information TI.

As such, the storage device 300 may set the time information enable attribute TIEN to the first value ENABLE during the time synchronization interval TSI and to the second value DISABLE during the interval other than the time synchronization interval TSI.

FIG. 22 is a diagram illustrating a time synchronization method according to example embodiments.

Referring to FIG. 22, setting of the synchronization condition including synchronization enable, the time resolution and the updating period as described above, and transferring of the host time information TI may be performed using various combinations of the UPIUs and the UniPro attributes.

In some example embodiments, as described with reference to FIGS. 15 through 19, both of setting of the synchronization condition and transferring of the host time information TI may be performed using the UPIUs.

In some example embodiments, as described with reference to FIGS. 20 and 21, both of setting of the synchronization condition and transferring of the host time information TI may be performed using the UniPro attributes.

In some example embodiments, setting of the synchronization condition may be performed using the UPIUs and transferring of the host time information TI may be performed using the UniPro attributes.

Figure 23:
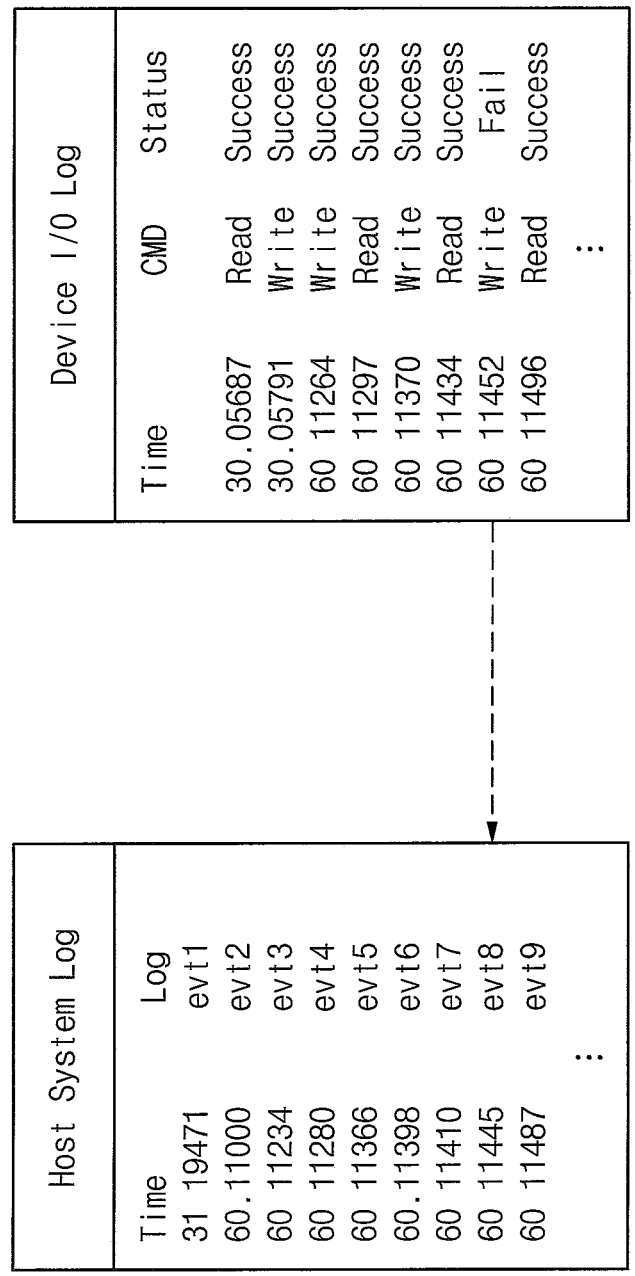
FIG. 23 is a diagram illustrating an example of utilizing time information by a time synchronization method according to example embodiments.

FIG. 23 is a diagram illustrating an example of utilizing time information by a time synchronization method according to example embodiments.

FIG. 23 illustrates an example of a host system log that is managed by the host device 200 and a device input-output (I/O) log that is managed by the storage device 300.

The host device 200 may manage the time of operations or events evt1~evt9 of the host device 200 based on the host time information TI of the host device 200. Based on the synchronized time information, the storage device 300 may synchronize the time information of the storage device 300 with the host time information TI provided from the host device 200 and manage the time and the status (that is, success or fail) of the command CMD transferred from the host device 200. If necessary, the host device 200 may query the device I/O log of the storage device 300 and obtain the exact time information, for example, the time of an error that has occurred.

The storage device 300 may efficiently perform various functions based on the synchronized time information.

In some example embodiments, in implementing an on-board debugging function to automatically store and extract information of the storage device 300 when a critical error occurs, the storage device 300 may store the information in synchronization with the host time information TI.

In some example embodiments, the synchronized time information may be used efficiently in retention monitoring through temperature monitoring, schemes related with erase to program interval (EPI), program time stamp (PTS), etc., which are associated with lifetime and reliability of a nonvolatile memory device included in the storage device 300. In addition, the synchronized time information may be used efficiently in valid period setting of data, time setting of background operations, host initiated defrag (HID), purge operation, etc., which are associated with performance of the nonvolatile memory device included in the storage device 300.

In some example embodiments, the synchronized time information may be used as input values of machine learning for analyzing patterns such as scheduling, throttling turbo write, host-aware performance booster, etc.

Figure 24:
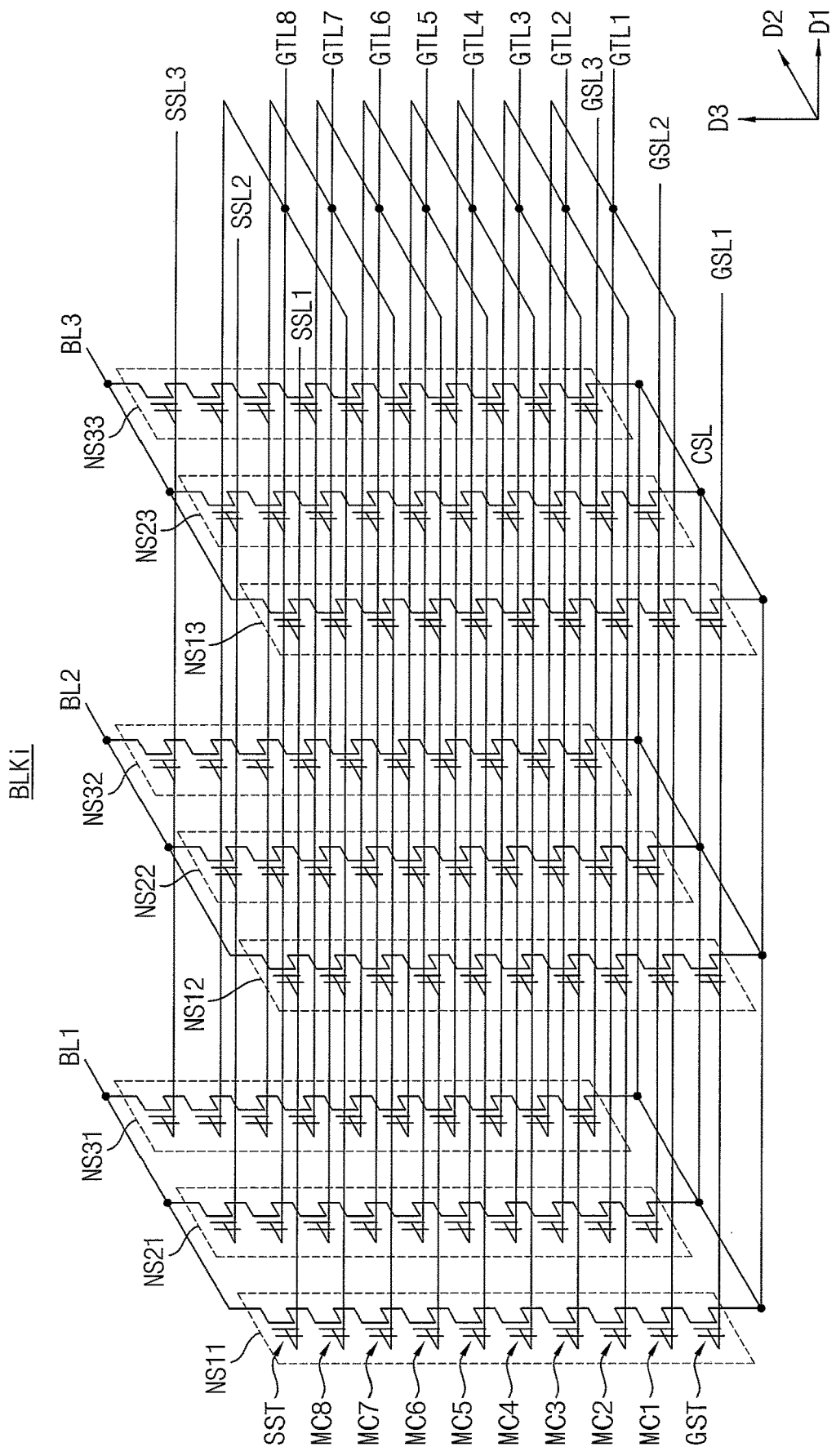
FIG. 24 is a circuit diagram illustrating an equivalent circuit of a memory block included in a nonvolatile memory device according to example embodiments.

FIG. 24 is a circuit diagram illustrating an equivalent circuit of a memory block included in a nonvolatile memory device.

Referring to FIG. 24, each memory block BLKi included in the memory cell array 510 in FIG. 5 may be formed on a substrate in a three-dimensional structure (or a vertical structure). For example, NAND strings or cell strings included in the memory block BLKi may be formed in a vertical direction D3 perpendicular to an upper surface of a substrate. A first direction D1 and a second direction D2 are parallel to the upper surface of the substrate.

The memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 24, each of the NAND strings NS11 to NS33 is illustrated to include eight memory cells MC1 to MC8. However, embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated. In FIG. 24, the memory block BLKi is illustrated as being coupled to eight gate lines GTL1 to GTL8 and three bitlines BL1 to BL3. However, example embodiments are not limited thereto, and each memory block in the memory cell array 510 may be coupled to various numbers of wordlines and various numbers of bitlines.

Figure 25:
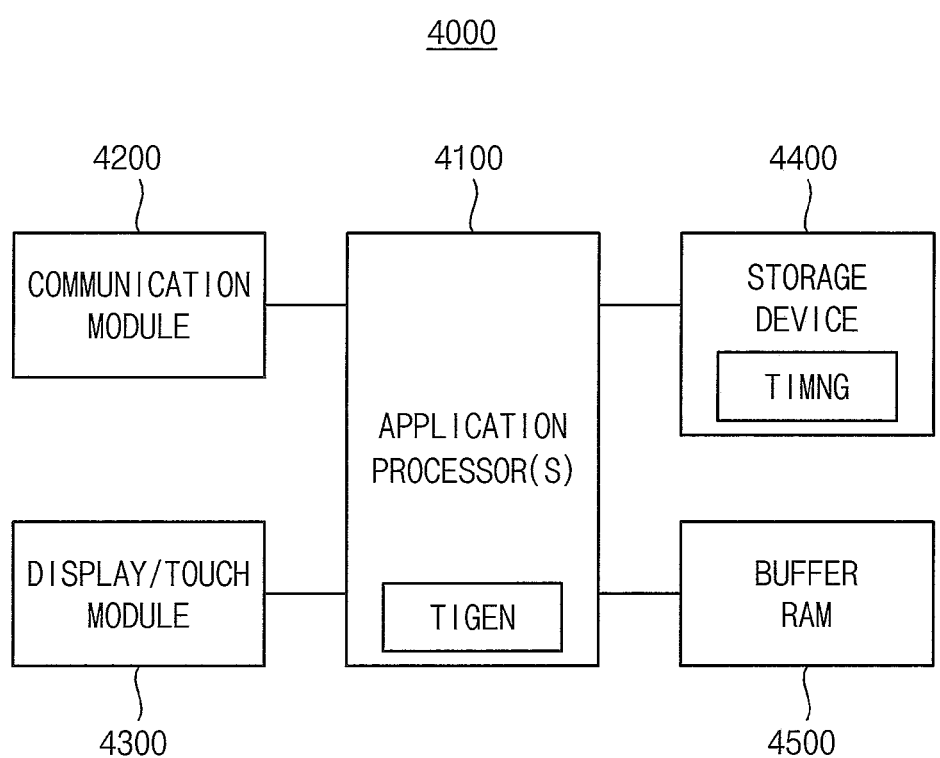
FIG. 25 is a block diagram illustrating an electronic device according to example embodiments.

FIG. 25 is a block diagram illustrating an electronic device according to example embodiments.

Referring to FIG. 25, an electronic device 4000 may include an application processor 4100, a communication module 4200 (e.g., a communicator), a display/touch module 4300 (e.g., a touch panel), a storage device 4400, and a buffer RAM 4500. The application processor 4100 may control operations of the electronic device 4000. The communication module 4200 may be implemented to perform wireless or wired communications with an external device. The display/touch module 4300 may be implemented to display data processed by the application processor 4100 or to receive data through a touch panel.

The storage device 4400 may be implemented to store user data. The storage device 4400 may be a solid state drive (SSD), an embedded multimedia card (eMMC), a universal flash storage (UFS), etc.

The buffer RAM 4500 may temporarily store data used for processing operations of the electronic device 4000. For example, the buffer RAM may be a dynamic random access memory (DRAM) such as a DDR (double data rate) SDRAM, (synchronous DRAM), a GDDR (graphics DDR) DRAM, an RDRAM (Rambus DRAM), etc.

The application processor 4100 may include a time information generator TIGEN to generate time information of the electronic device 4000 and the storage device 4400 may include a time information manager TIMNG. According to example embodiments, the time information manager TIMNG may synchronize the time information of the storage device 4400 with the time information provided from the time information generator TIGEN of the application processor 4100 corresponding to the above-described host device.

As described above, methods and systems according to example embodiments may reduce overhead due to transfer of the time information and enhance performance of the storage device and the system, by providing the time information from the host device to the storage device only during the time synchronization interval that is identified by the storage device. In addition, methods and systems according to example embodiments may further reduce the overhead of transferring the time information, by transferring the time information using the established signals without additional signals for the time information transfer.

Example embodiments may be applied to various electronic devices and systems that include a storage device. For example, example embodiments may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

At least one of the components, elements, modules or units (collectively "components" in this paragraph) represented by a block in the drawings may be embodied as various numbers of hardware, software and/or firmware structures that execute respective functions described above, according to example embodiments. These components may include, for example, the host processor 210, the host memory 220, the storage controller 310, the nonvolatile memories 320a, 320b and 320c, the buffer memory 330, the processor 410, the memory 420, the TI manager 430, the host interface 440, the ECC 450, the AES 470, the memory interface 460, the memory cell array 510, the address decoder 520, the page buffer circuit 530, the data input/output circuit 540, the voltage generator 550, the control circuit 560, the memory controller 620, the application processor 4100, the communication module 4200, the display/touch module 4300, the storage device 4400, and the buffer RAM 4500, shown in FIGS. 2, 4-6 and 25, not being limited thereto. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:
1. A system comprising:
 a storage device comprising:
  a storage controller; and
  a plurality of nonvolatile memory devices; and
 a host device comprising a host processor, wherein the storage controller is configured to identify a time synchronization interval, and control the storage device to notify the time synchronization interval to the host device, and wherein the host processor is configured to control the host device to provide host time information to the storage device during the time synchronization interval.

2. The system of claim 1, wherein the storage controller is further configured to control the storage device to:
   notify a start of the time synchronization interval to the host device; and
   notify an end of the time synchronization interval to the host device.

3. The system of claim 2, wherein the host processor is further configured to control the host device to:
   provide the host time information to the storage device based on notification of the start of the time synchronization interval; and
   stop provision of the host time information based on notification of the end of the time synchronization interval.

4. The system of claim 1, wherein the host device and the storage device are configured to communicate with each other according to universal flash storage (UFS) standards.

5. The system of claim 4, wherein the storage controller is further configured to control the storage device to notify the host device of the time synchronization interval using UFS protocol information units (UPIUs) according to the UFS standards, and
   wherein the host processor is further configured to control the host device to provide the host time information to the storage device using UPIUs according to the UFS standards.

6. The system of claim 4, wherein the storage controller is further configured to control the storage device to notify the time synchronization interval to the host device using UniPro attributes according to the UFS standards, and
   wherein the host processor is further configured to control the host device to provide the host time information to the storage device using UniPro attributes according to the UFS standards.

7. The system of claim 4, wherein the storage controller is further configured to control the storage device to:
   notify a start of the time synchronization interval to the host device by setting a synchronization setting bit to a first value, the synchronization setting bit being provided in a device information field of a response UPIU that is transferred from the storage device to the host device; and
   notify an end of the time synchronization interval to the host device by setting the synchronization setting bit to a second value.

8. The system of claim 4, wherein the host processor is further configured to control the host device to:
   add the host time information to an extra header segment of a request UPIU; and
   provide the request UPIU to the storage device.

9. The system of claim 4, wherein the host processor is further configured to control the host device to:
   transfer a query request UPIU from to the storage device; and
   set a time resolution of the host time information based on the query request UPIU and a query response UPIU, and wherein the storage controller is further configured to control the storage device to transfer, based on the query request UPIU, the query response UPIU to the host device.

10. The system of claim 4, wherein the host processor is further configured to control the host device to set a time information enable attribute indicating the time synchronization interval and a time information attribute indicating the host time information, among UniPro attributes of the host device according to the UFS standards.

11. The system of claim 10, wherein the storage controller is further configured to control the storage device to:
   transfer a first set request service primitive indicating a start of the time synchronization interval to the host device; and
   transfer a second set request service primitive indicating an end of the time synchronization interval to the host device, and
   wherein the host processor is further configured to control the host device to:
   set the time information enable attribute to a first value based on the first set request service primitive; and
   set the time information enable attribute to a second value based on the second set request service primitive.

12. The system of claim 11, wherein the host processor is further configured to control the host device to periodically update a value of the time information attribute while the time information enable attribute has the first value.

13. The system of claim 11, wherein the storage controller is further configured to control the storage device to transfer a get request service primitive requesting the host time information to the host device, and
   wherein the host processor is further configured to control the host device to transfer a get response service primitive indicating a value of the time information attribute to the storage device based on the get request service primitive.

14. The system of claim 4, wherein the storage controller is further configured to control the storage device to set a time information enable attribute indicating the time synchronization interval and a time information attribute indicating the host time information, among UniPro attributes of the storage device according to the UFS standards.

15. The system of claim 14, wherein the storage controller is further configured to control the storage device to:
   set the time information enable attribute to a first value during the time synchronization interval and to a second value during an interval other than the time synchronization interval; and
   transfer a get response service primitive indicating a value of the time information enable attribute to the host device based on the get request service primitive, and
   wherein the host processor is further configured to control the host device to transfer a get request service primitive requesting the value of the time information enable attribute to the storage device.

16. The system of claim 15, wherein the host processor is further configured to control the host device to transfer a set request service primitive indicating the host time information to the storage device based on the value of the time information enable attribute in the get response service primitive being the first value, and
   wherein the storage controller is further configured to control the storage device to update the value of the time information attribute based on the host time information indicated by the set request service primitive.

17. The system of claim 4, wherein the host processor is further configured to control the host device to set a time information configuration attribute indicating a time resolution and an updating period of the host time information that are provided from the host device, among UniPro attributes of the host device according to the UFS standards.

18. The system of claim 17, wherein the host processor is further configured to control the host device to set a value of the time information configuration attribute using UPIUs or service primitives according to the UFS standards.

19. A method of synchronizing time between a host device and a storage device, the method comprising:
- identifying, by the storage device, a time synchronization interval;
- notifying the time synchronization interval from the storage device to the host device;
- providing host time information from the host device to the storage device during the time synchronization interval; and
- synchronizing, by the storage device, time information of the storage device with the host time information.

20. A method of synchronizing time between a host device and a storage device that communicate with each other according to universal flash storage (UFS) standards, the method comprising:
- identifying, by the storage device, a time synchronization interval;
- notifying a start of the time synchronization interval from the storage device to the host device;
- providing host time information from the host device to the storage device based on the time synchronization interval;
- notifying an end of the time synchronization interval from the storage device to the host device; and
- stopping, by the host device, provision of the host time information based on the end of the time synchronization interval,
- wherein the start of the time synchronization interval and the end of the time synchronization interval are notified from the storage device to the host device and the host time information is provided from the host device to the storage device, using UFS protocol information units (UPIUs) or UniPro attributes of the host device or the storage device according to the UFS standards.

* * * * *